(12) United States Patent
Tanaka

(10) Patent No.: US 7,628,697 B2
(45) Date of Patent: Dec. 8, 2009

(54) GAME APPARATUS, GAME PROGRESSING METHOD, PROGRAM, AND RECORDING MEDIUM

(75) Inventor: Motoharu Tanaka, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 207 days.

(21) Appl. No.: 11/627,641

(22) Filed: Jan. 26, 2007

(65) Prior Publication Data
US 2007/0191096 A1  Aug. 16, 2007

(30) Foreign Application Priority Data
Jan. 27, 2006 (JP) .............................. 2006-019830

(51) Int. Cl.
*A63F 13/00* (2006.01)
(52) U.S. Cl. .............................. 463/31; 463/5; 463/32; 463/52; 273/317.1; 273/367; 345/419; 345/636; 345/664
(58) Field of Classification Search ................. 463/1–5, 463/7–8, 23, 30–34, 40–43, 36–39, 49–57; 345/156, 419, 1.1–1.3, 2.1–2.3, 3.1–3.4, 345/24, 467–469, 539, 543–544, 625, 636, 345/638, 653–656, 664–666, 682–683, 686, 345/949–950, FOR. 139, FOR. 153; 273/108.1, 273/127 R, 148 R, 148 B, 309, 317.1, 340, 273/348, 361–367; 717/168–178; 348/14.15, 348/39, 42, 47–52, 121, 136–137, 211.14, 348/576, 588–589, 719, 721, E13.004, E13.064–E13.067; 434/38, 43–44, 69, 118, 256–257; 375/240.15–240.16, 375/240.25; *A63F 13/00, 13/06, 13/10*
See application file for complete search history.

(56) References Cited
U.S. PATENT DOCUMENTS
6,162,120 A * 12/2000 Takahashi et al. .............. 463/8
(Continued)

FOREIGN PATENT DOCUMENTS
EP  1475132  11/2004
(Continued)

OTHER PUBLICATIONS
Devil May Cry, Oct. 17, 2001, Capcom Entertainment, Inc., see full document.*
(Continued)

*Primary Examiner*—Peter DungBa Vo
*Assistant Examiner*—Arthur O. Hall
(74) *Attorney, Agent, or Firm*—Greenblum & Bernstein P.L.C.

(57) ABSTRACT

A game apparatus executes a game in which a player character is moved between different fields through a given traveling route according to an instruction input from a player. When the player character moves to a first area close to a door, a symbol "!" is displayed. When the character moves to a second area, a symbol set "!!" is displayed. In the second area, if unlocking conditions for the door are satisfied, a method of manipulation for opening the door is displayed. If the conditions are not satisfied, a method of manipulation for displaying a hint for opening the door is displayed. If the conditions for unlocking the door are satisfied, when the player performs the manipulation for opening the door, an action of the player character to open the door is displayed. Map data of the destination room is loaded into a temporary storage from a recording medium and then the player character moves to the opposite room through the door.

13 Claims, 7 Drawing Sheets

U.S. PATENT DOCUMENTS

| | | | |
|---|---|---|---|
| 6,196,917 B1 * | 3/2001 | Mathias et al. ................. | 463/2 |
| 6,267,676 B1 * | 7/2001 | Nagaoka ...................... | 463/43 |
| 6,299,535 B1 | 10/2001 | Tanaka | |
| 6,325,717 B1 | 12/2001 | Kawagoe et al. | |
| 6,585,599 B1 * | 7/2003 | Horigami et al. .............. | 463/43 |
| 6,609,976 B1 | 8/2003 | Yamagishi et al. | |
| 6,755,743 B1 * | 6/2004 | Yamashita et al. ............ | 463/42 |
| 6,821,206 B1 * | 11/2004 | Ishida et al. ................... | 463/43 |
| 6,878,065 B2 * | 4/2005 | Yamamoto et al. ............ | 463/31 |
| 6,923,717 B2 * | 8/2005 | Mayer et al. ................... | 463/4 |
| 6,979,265 B2 * | 12/2005 | Suzuki ......................... | 463/31 |
| 7,170,508 B2 * | 1/2007 | Ohno et al. ................... | 345/419 |
| 7,229,349 B2 * | 6/2007 | Yamada ......................... | 463/9 |
| 7,374,480 B2 * | 5/2008 | Otani et al. ................... | 463/8 |
| 7,467,998 B2 * | 12/2008 | Yamada et al. ................. | 463/9 |
| 2001/0029202 A1 * | 10/2001 | Kondo et al. ................... | 463/31 |
| 2002/0171647 A1 | 11/2002 | Sterchi et al. | |
| 2004/0204212 A1 | 10/2004 | Sato | |
| 2004/0229687 A1 * | 11/2004 | Miyamoto et al. ............ | 463/30 |
| 2006/0073862 A1 * | 4/2006 | Shinoda et al. ................ | 463/1 |
| 2006/0094502 A1 * | 5/2006 | Katayama et al. ............. | 463/31 |

FOREIGN PATENT DOCUMENTS

JP     2002-200351     7/2002

OTHER PUBLICATIONS

Final Fantasy X-2, Nov. 18, 2003, Square Enix U.S.A., Inc., see full document.*

Street Fighter Alpha 2, Oct. 1, 1996, Capcom Entertainment, Inc.*

"Dengeki Nintendo64 (Shadowgate 64-Trials of the Four Towers)," MediaWorks Inc., Jul. 1, 1999, vol. 4, No. 7, pp. 80-81, and an English language partial translation of the same.

"Dengeki PlayStation (Final Fantasy)," MediaWorks Inc., Mar. 26, 2004, vol. 10, No. 9, pp. 234-235, and an English language partial translation of the same.

"Capcom walk-through series (28) Gun Surviver 4, Biohazard, Heroes never die, walk-through guide, first edition," Capcom Co., Ltd., Mar. 15, 2003, first edition, p. 11, ISBN: 4-575-16373-2, and an English language partial translation of the same.

* cited by examiner

FIG. 4

| ROOM | | | ADVANCE NOTICE | | | | | | | DESTINATION | |
|---|---|---|---|---|---|---|---|---|---|---|---|
| ID | AREA INFORMATION | SEARCH FLAG | DOOR POSITION INFORMATION | ADVANCE NOTICE AREA | | NON-DISPLAY FLAG | UNLOCKING FLAG | UNLOCKING CONDITIONS | COMMENT | ROOM ID | POSITION INFORMATION |
| | | | | FIRST | SECOND | | | | | | |
| A | | 1 | 201-ab | 202-ab | 203-ab | 0 | 0 | POSSESSION OF *KEY | *KEY IS NEEDED | B | |
| B | | 0 | 201-ab | 202-ba | 203-ba | 0 | 0 | POSSESSION OF *KEY | *KEY IS NEEDED | A | |
| | | | 201-bc | 202-bc | 203-bc | 0 | 0 | DEPRESS * | BUTTON SHOULD BE PRESENT ANYWHERE | C | |
| | | | 201-bd | 202-bd | 203-bd | 0 | 0 | | | D | |
| C | | 0 | 201-bc | 202-cb | 203-cb | 0 | 0 | DEPRESS * | BUTTON SHOULD BE PRESENT ANYWHERE | D | |
| D | | 0 | 201-bd | 202-db | 203-db | 0 | 0 | | | B | |

400

GAME APPARATUS, GAME PROGRESSING METHOD, PROGRAM, AND RECORDING MEDIUM

CROSS REFERENCE TO RELATED APPLICATION

The present disclosure relates to subject matter contained in Japanese Patent Application No. 2006-019830, filed on Jan. 27, 2006, the disclosure of which is expressly incorporated herein by reference in its entirety.

BACKGROUND OF THE INVENTION

1. Field of the Invention

The present invention relates to a game apparatus which displays information that gives notice of a status of a game in progress on a screen, which game is advanced by moving a player character in a virtual space. The invention also relates to a method of progressing such a game, to a program, and to a recording medium for such a game.

2. Description of the Related Art

Generally, in a role playing game (RPG), a game is advanced by moving a player character controlled by a player (user) on a map in a virtual space and solving problems. In a case where a building is present on the map, the player character can go into and out of the building. In some cases, doors are set at the entrance and exit of the building. Furthermore, in a case where the inside of the building is partitioned into plural rooms, doors may be set between the rooms.

In a game where a player character can go into and out of a building through such a door, or go into and out of different rooms, the door may be automatically opened when the player character moves, for example, into a given range near the door. If the door is opened in this way, the player character may pass through the door. Furthermore, in other games, the door opens when the player performs a predetermined manipulation to cause the player character to perform a preset action in a given range near the door, In many games, a door is provided that opens only when the player completes a predetermined task in a game, irrespective of the case where the player character moves into a given range and thereby the door opens automatically, or in a case where the door is opened by a player's manipulation. The task may be, for example, to acquire a key for the door. In a game where a predetermined manipulation is required to open the door, a player should perform a predetermined manipulation in practice in order to confirm whether the door can be opened.

On the other hand, Japanese Unexamined Patent Publication No. 2002-200351 discloses a game which displays a navigational window, providing a hint, that is displayed on a screen in order to assist a player who is not familiar with playing a game to perform a certain action when the certain action is executable.

In the game described above, an icon is displayed, indicating that the player character can perform special actions. Further, a menu is displayed for selecting executable special actions. Furthermore, a message is displayed providing a hint as to how to deal with the special actions that cannot be executed. Thus, the game makes it easy for the player to perform special actions, and thereby makes it possible for the player to enjoy various tricks and events provided in the game, even when the player is not familiar with the game. However, the navigation display described above is not necessary for players who are familiar with the game. Furthermore, for players who are not familiar with the game, the display should be provided only when a manipulation for performing a special action is possible.

On the other hand, a player may easily recognize the presence of a door partitioning the inside of a building from the outside, or a door partitioning different rooms, by viewing the game display. Furthermore, with respect to a door that is opened by a player's manipulation, the manipulation is generally unified within one game and a very simple action. Therefore, it is not necessary to purposely display a manipulation for opening the door, even when the player is not familiar with the game. If the manipulation is easy for the player to perform, it is still cumbersome to perform an action for opening the door that should not be opened.

Meanwhile, in order to make the game screen realistic, images showing the manner in which a door is opened are first displayed on the screen when a player character passes through the door. Then, images showing the manner in which the player character has passed beyond the door are displayed. Even if the player performs a given manipulation only to check whether the door can be opened, the player should wait to perform actions for the game until the door is opened and movement of the player character is completed. Further, when the player attempts to return to the original position, the same sequence of images will be displayed.

In some games, map data sets are prepared separately for the inside and outside of a building within a virtual space, or for different rooms. In some cases, only map data corresponding to the position at which a player character is present is loaded in a main memory of the game apparatus. When the player performs a manipulation only to check whether a door can be opened, the player must wait until map data for a destination of the movement is loaded into the main memory. If the player attempts to return to the original position, the map data should be loaded again. In this way, when the player performs a manipulation to check whether the door can be opened, despite no necessity to move the player character beyond the door, there is a problem that smooth progress of the game is hindered greatly.

SUMMARY OF THE INVENTION

The present invention is made in view of these problems. It is an object of the present invention to provide a game apparatus, and the like, which allows a player (user) to quickly progress through a game without wasteful manipulations, in which game a player character can pass through a given traveling route, including a door or the like, according to an instruction by the player.

A game apparatus, according to a first embodiment of the present invention, is a game apparatus for executing a game that is advanced by moving a player character in a virtual space. The virtual space includes a first field and a second field opening into the first field via a predetermined traveling route. The game apparatus displays an image representing a status of the game being executed on a display. The game apparatus includes a normal movement input unit that inputs an instruction for moving the player character in the virtual space, including the first and second fields, in accordance with a first manipulation. The game apparatus further includes a cross-field movement input unit that inputs an instruction for moving the player character from the first field to the second field through the traveling route in accordance with a second manipulation. The game apparatus still further includes a normal mover that moves the player character in any one of the first and second fields in which the player character is present in accordance with the instruction input from the normal movement input unit. The game apparatus still further includes a movement restriction switching unit that switches a status of the game between a cross-field movement disabled state, in which the player character is not allowed (or prohibited) to move from the first field to the second field, and a cross-field movement enabled state, in which the player character is allowed to move from the first field to the second field, in accordance with conditions established during progress of the game. The game apparatus still further includes a cross-field movement enable/disable determiner that determines whether the status has been switched to the cross-field movement enabled state by the movement restriction switching unit when the player character is moved by the normal mover to a certain region set based on a position of the traveling route within the first field. The game apparatus still further includes a cross-field movement enable/disable display unit that displays cross-field movement enable/disable information, indicating whether the player character is allowed to move from the first field to the second field on the display based upon the determination made by the cross-field movement enable/disable determiner. The game apparatus still further includes a cross-field mover that moves the player character from the first field to the second field when an instruction for moving the player character from the first field to the second field is input from the cross-field movement input unit, and when the cross-field movement enable/disable determiner determines that the status has been switched to the cross-field movement enabled state. The game apparatus still further includes a cross-field movement prohibiting unit that keeps the player character within the first field without moving the player character to the second field when an instruction for moving the player character from the first field to the second field is input from the cross-field movement input unit, and when the cross-field movement enable/disable determiner determines that the status has been switched to the cross-field movement disabled state.

In this game apparatus, the status of the game may be either in the cross-field movement disabled state or in the cross-field movement enabled state according to the conditions established during the course of the game. If the player cannot judge whether the status is the cross-field movement disabled state or cross-field movement enabled state from the images of the game displayed on the screen, the player cannot judge whether the player character can be moved from the first field over to the second field unless an instruction for moving the character to the adjacent field is input from the cross-field movement input unit. If the result is that the status is the cross-field movement disabled state, inputting of an instruction from the cross-field movement input unit is wasteful. It follows that the player has been urged to perform complex manipulations.

In this regard, in the above-described game apparatus, if the player character moves into the given range set based on a position in the traveling route within the first field, a decision is made as to whether the status has been switched to the cross-field movement enabled state or the cross-field movement disabled state. Information indicating the result of the decision as to whether cross-field movement is enabled or disabled is displayed on the display device. The player can determine that the status is the cross-field movement disabled state from the information displayed on the display device as to whether cross-field movement is enabled or disabled without entering an instruction from the cross-field movement input unit, thereby minimizing wasteful manipulations by the player.

Furthermore, where it is not necessary to move the player character to the second field during progress of a game, but the player wants to determine whether the character can be moved from the first field over to the second field, the player can make this determination from the information displayed on the display device as to whether a cross-field movement is enabled, or not. Therefore, when the player wants to know whether the player character can be moved from the first field over to the second field, the player is not urged to perform wasteful manipulations. In this way, the player is not required to perform wasteful manipulations in moving the player character from the first field over to the second field. Consequently, he or she can smoothly progress the game.

In the game apparatus described above, the cross-field movement enable/disable display unit may include across-field movement enablement display unit which, when the cross-field movement enable/disable determiner determines that the status has been switched to the cross-field movement enabled state, displays cross-field movement permission information as the cross-field movement enable/disable information on the display device, the cross-field movement permission information indicating that the player character can be moved from the first field to the second field.

The cross-field movement enable/disable display unit may include a cross-field movement disenablement display unit which, when the cross-field movement enable/disable determiner determines that the state has been switched to the cross-field movement disabled state, displays cross-field movement disenablement information as the cross-field movement enable/disable information on the display device, the cross-field movement disenablement information indicating that the player character cannot be moved from the first field to the second field.

The cross-field movement enable/disable display unit may include both the cross-field movement enablement display unit and the cross-field movement disablement display unit. In this case, the cross-field movement permission information and the cross-field movement disenablement information are different in content. This permits the player to judge whether the status is the cross-field movement enabled state or the cross-field movement disabled state. Furthermore, the cross-field movement enable/disable display unit may include only one of the cross-field movement enablement display unit and the cross-field movement disenablement display unit. In this case, if the cross-field movement enable/disable display unit includes only the cross-field movement enablement display unit, the player can judge that the status is the cross-field movement enabled state when the cross-field movement permission information is displayed, or that the status is the cross-field movement disabled state if nothing is displayed as the cross-field movement enable/disable information.

Where the cross-field movement enable/disable display unit has the cross-field movement disenablement display unit, the cross-field movement disenablement display unit can include a cross-field movement enablement display unit, which displays the aforementioned cross-field movement disenablement information on the display device. In this case, the cross-field movement disenablement information is information indicating conditions to be established to switch the status from the cross-field movement disabled state to the cross-field movement enabled state by the movement restriction-switching unit.

The game apparatus can further include cross-field movement enablement display unit which, when the cross-field movement enable/disable decision unit determines that the status has been switched to the cross-field movement disabled state and, at the same time, an instruction for moving the player character to an adjacent field is entered from the cross-field movement input unit, displays information on the display unit, the information indicating conditions to be established to switch the status from the cross-field movement disabled state to the cross-field movement enabled state by the movement restriction-switching unit.

The information indicating conditions to be established to enable movement from the first field over to the second field is displayed by the cross-field movement enablement display unit. Consequently, the player can determine a desired course of action to be performed in the course of the game. Hence, the game can be progressed smoothly.

In the game apparatus described above, the normal mover may include a direction-switching unit for switching the direction of the player character according to an instruction entered from the normal movement input unit. In this case, the game apparatus can further include a direction determiner for determining whether the direction of the player character faces in a given direction relative to the position in the traveling route between the first and second fields when the player character has been moved into the given range by the normal mover. When the direction determiner determines that the player character faces in the given direction, the cross-field movement enable/disable display unit displays the cross-field movement enable/disable information on the display device. When the cross-field movement enable/disable determiner determines that the status has been switched to the cross-field movement enabled state, if an instruction for moving the player character to an adjacent field from the cross-field movement input unit is entered and, at the same time, if the direction determiner determines that the character faces in the given direction, the cross-field mover moves the player character from the first field to the second field. When an instruction for moving the player character to the adjacent field from the cross-field movement input unit is entered and, at the same time or substantially the same time, the direction determiner determines that the character does not face in the given direction, the cross-field movement prohibiting unit can inhibit the player character from being moved to the second field, holding the character within the first field even if the cross-field movement enable/disable determiner determines that the status has been switched to the cross-field movement disabled state.

If the player character does not face in the given direction, the character cannot be moved from the first field over to the second field in any way. Accordingly, information indicating whether the status is the cross-field movement disabled state or the cross-field movement enabled state is not necessary for the player. It is assumed here that such unnecessary information is displayed as infrequently as possible. Therefore, the player is prevented from being annoyed with information that is not necessary for the progress of the game.

The game apparatus may further include a traveling route display unit for displaying traveling route information on the display device when the player character has been moved into a second given range, which is wider than the first-mentioned given range, set based on a position in a traveling route within the first field going to the second field by the normal mover, the traveling route information indicating the presence of the traveling route going from the first field to the second field.

When the player character has moved close to the traveling route between the first and second fields (e.g., a given range), the intervening traveling route is displayed as a status of the game on the display device. The player can easily recognize that the second field, which is different from the first field, is formed in the virtual space. Yet, there is a possibility that, when the traveling route is not yet sufficiently displayed, the player may miss the existence of the second field and let the game progress, without fully enjoying the game. On the other hand, in the above-described game apparatus, the traveling route information is displayed on the display device when the player character has moved into the second given range, which is wider than the first given range. Therefore, at this time, if the traveling route is not sufficiently displayed as a status of the game, the player can progress the game without missing the second field. Consequently, the player can fully enjoy the game.

The cross-field movement enable/disable determiner makes a decision as to whether the status has been switched to the cross-field movement enabled state by the movement restriction-switching unit when the player character has moved into the second certain range. The traveling route display unit may display the traveling route information on the display device, provided that the cross-field movement enable/disable determiner has determined that the status has been switched to the cross-field movement enabled state.

When the player character has moved into the second certain range, somewhat closer to the traveling route going to the second field from the first field, it is not necessary to bring the player character close to the traveling route when the status is the cross-field movement disabled state, in which movement to the second field is disabled. The traveling route information is displayed according to the necessity to bring the player character close to the traveling route going to the second field from the first field. This eliminates the player's wasteful operation consisting of progressing the game to search for a traveling route to the second field to which movement cannot be made from other field. Consequently, the game can be progressed more quickly.

The game apparatus further includes a movement information storage for storing field movement information indicating whether the player character has been moved to the second field by the normal mover. The apparatus still further includes a movement information determiner for making a determination as to whether the field movement information stored in the movement storage indicates whether the character has moved to the second field when the cross-field movement enable/disable determiner determines that the status has been switched to the cross-field movement enabled state. The apparatus may still further include a movement history display unit for displaying movement history information, indicating whether the player character has moved to the second field, according to the result of the determination made by the movement information determiner on the display.

In games having plural fields formed in a virtual space, such as, for example, games executed on the game apparatus described above, moving the player character into one field often produces wasteful results after execution of events set for this field has been completed. In this case, field movement information indicating whether the player character has moved through the second field is stored in the movement information storage. When the character has already moved through the second field and, at the same time or substantially the same time, the player character can be moved from the first field over to the second field, movement history information indicating the information is displayed on the display device. Therefore, in a special case where the player has forgotten that the player character moved through the second field, the useless situation of moving the player character to the second field can be prevented. As a result, the game can be progressed quickly and smoothly.

The movement information stored in the movement information storage may be replaced by information indicating that the player character made a movement within the second field, e.g., the character simply entered the second field. Furthermore, the movement information may be replaced by information indicating that the character made a movement within the second field, provided that the player character moved out of the first or second certain range within the second field. In addition, the movement information may be replaced by information indicating that the character made a movement within the second field, provided that execution of given events set for the second field has completed. Further, the movement information may be replaced by information indicating that the character has made a movement within the second field, provided that the player character has acquired all items placed in the second field. Additionally, the movement information may be replaced by information indicating that the character has made a movement within the second field, provided that the player character has entered a certain range set outside the first or second range and within the second field.

In the game apparatus described above, a movement restriction object can be formed in the traveling route between the first and second fields and have two states. The movement restriction object may include an open state and a closed state. In the open state, the player character is enabled to move from the first field over to the second field under the cross-field movement enabled state. In the closed state, the player character is disabled from being moved to the adjacent field under the cross-field movement enabled state. Furthermore, the movement restriction object may include a closed state similar to the aforementioned closed state under the cross-field movement disabled state. In this case, the game apparatus may further include an object state-switching unit for switching the cross-field movement restriction object from the closed state to the open state before the player character is moved from the first field to the second field by the cross-field mover, and for switching the cross-field movement restriction object again to the closed state after the player character has moved into the second field.

For example, if the player manipulates the cross-field movement input unit to check whether the player character can be moved from the first field over to the second field, in spite of the fact that he or she only wants to know whether the character can be moved over to the second field, the player must wait for progress of the game during the period between the instant when the movement restriction object is switched from the closed state to the open state, and the instant when the player character moves to the second field, provided that the status has been switched to the cross-field movement enabled state. If the movement restriction object is switched from the closed state to the open state, similarly when the character returns to the first field from the second field, the player must wait for progress of the game for a longer time.

On the other hand, in the above-described game apparatus, if the player character moves into a certain range set based on the position in the traveling route within the first field, cross-field movement enable/disable information is displayed on the display device according to whether the status is switched to the cross-field movement enabled state or cross-field movement disabled state. Since the cross-field movement enable/disable information is displayed, the player is not urged to enter a useless instruction from the cross-field movement input unit. This eliminates the period during which the player must wait for progress of the game to switch the state of the movement restriction object, unless an instruction from the cross-field movement input unit is entered. Consequently, the player can progress the game quickly and smoothly.

The game apparatus can further include a map data read-only storage in which first map data made up of graphics data of the first field, including the traveling route, and second map data made up of graphic data of the second field, including the traveling route, are stored. The game apparatus may still further include a high-speed storage having a higher data readout rate than the map data read-only storage, and having a character data area for storing character data made up of graphics data of the player character, and a map data area for storing map data of the field, including the position into which the player character has moved, the map data being included in the first and second map data. The game apparatus may still further include a map data loading unit for reading map data of a destination field from the map data read-only storage and storing the map data read out into the map data area, instead of the previously stored map data of a starting field, when the player character moves between the first and second fields.

For example, if the player only wants to know whether the player character can be moved from the first field over to the second field, but the player manipulates the cross-field movement input unit only to check whether the character can be moved in this way, and if the status has been switched to the cross-field movement enabled state, the player must wait for progress of the game during the period in which the map data of the second field is loaded into the high-speed storage. If the map data of the first field is similarly loaded into the high-speed storage when the character returns to the first field from the second field, the player must wait for progress of the game for a longer time.

In contrast, in the above-described game apparatus, if the player character moves into a certain range, which is set based on the position of the traveling route within the first field, cross-field movement enable/disable information is displayed on the display device according to whether the status has been switched to the cross-field movement enabled state, or the cross-field movement disabled state. Since the cross-field movement enable/disable information is displayed, the player is not required to enter a useless instruction from the cross-field movement input unit. If an instruction from the cross-field movement input unit is not entered, the period in which the player must wait for progress of the game to load such map data into the high-speed storage is eliminated. Consequently, the player can progress the game quickly and smoothly.

In the above-described game apparatus, the virtual space has three or more fields including the first and second fields. Each field can be in communication with another field, or fields, via a given traveling route. In this case, the cross-field movement input unit can enter an instruction for moving the player character from an arbitrary field, other than the first field, to another field via the traveling route, according to the same player's manipulation as the manipulation for entering an instruction for moving the player character from the first field over to the second field.

If the same manipulation (e.g., inputting of an instruction from the cross-field movement input unit) is necessary to move the character between different fields, other than between the first and second fields, it is not necessary to purposely display the manipulation for moving the player character only for cross-field movement from the first field to the second field, for the following reason. The traveling route between fields is displayed on the display device. This makes it quite clear for the player whether it is necessary to enter an instruction from the cross-field movement input unit. Display of this quite obvious manipulation is annoying to the player.

Note that the player cannot judge whether the character can be moved from the first field over to the second field unless the player fully understands the conditions under which the player switches the status of the game from the cross-field movement disabled state to the cross-field movement enabled state. Accordingly, since cross-field movement enable/disable information, indicating whether the status is cross-field movement disabled state or cross-field movement enabled state, is displayed on the display device, it is easy for the player to judge whether such manipulation produces effective results, even if it is obvious for the player whether it is necessary to enter an instruction from the cross-field movement input unit. Furthermore, when inputting from the cross-field movement input unit is done frequently for other than cross-field movement between the first and second fields, even if images indicating whether cross-field movement from the first field to the second field is possible are displayed, the player often forgets it. Therefore, displaying the cross-field movement enable/disable information produces more conspicuous effects.

According to a second aspect of the present invention, there is provided a game progressing method executed on a computer by moving a player character in a virtual space. The virtual space includes a first field and a second field, opening into the first field via a predetermined traveling route. The computer system includes a storage, including a character position storage area for storing positions of the player character in the virtual space. The computer system further includes a normal movement input device for inputting an instruction for moving the player character in the virtual space, including the first and second fields in accordance with a first manipulation. The computer system still further includes a cross-field movement input device for inputting an instruction for moving the player character from the first field to the second field through the traveling route in accordance with a second manipulation. The computer system still further includes a display device for displaying game images representing a status of the game being executed. The method includes moving the player character in any one of the first and second fields, in which the player character is present in accordance with an instruction input from the normal movement input device and storing the position of the moved player character in the character position storage area. The method further includes switching the status between a cross-field movement disabled state, in which the player character cannot move from the first field to the second field, and a cross-field movement enabled state, in which the player character can move from the first field to the second field, according to conditions established during progress of the game, and storing information indicating to which of the cross-field movement disabled state and cross-field movement enabled state has the status been switched in a cross-field enable/disable storage area contained in the storage. The method still further includes determining which of the cross-field movement disabled state and the cross-field movement enabled state has the status been switched to by referring to the cross-field movement enable/disable storage area when the player character has moved into a certain region set based on a position in a traveling route in the first field. The method still further includes displaying the cross-field movement enable/disable information, indicating whether the player character can be moved from the first field over to the second field based on a determination concerning to which of the cross-field movement enabled state and the cross-field movement disabled state has the status been switched to on the display together with the game images. The method still further includes moving the player character from the first field to the second field when it is determined that the status has been switched to the cross-field movement enabled state and, at the same time or substantially the same time, an instruction for moving the player character from the first field to the second field is input from the cross-field movement input device, and storing the position of the moved player character in the character position storage area. The method still further includes causing the position stored in the character position storage area to be retained within the first field without moving the player character to the second field when it is determined that the status has been switched to the cross-field movement disabled state and, at the same time or substantially the same time, an instruction for moving the player character from the first field to the second field is input from the cross-field movement input device.

According to a third aspect of the present invention, there is provided a program executed on a computer system connected with a display device for displaying an image representing status of a game being executed. The game is advanced by moving a player character in a virtual space. The virtual space a first field and a second field, opening into the first field via a predetermined traveling route. The program, including corresponding code sections for each of the following functions, causes the computer system to function as a normal movement input unit that inputs an instruction for moving the player character in the virtual space, including the first and second fields, in accordance with a first manipulation. The program further causes the computer system to function as a cross-field movement input unit that inputs an instruction for moving the player character from the first field to the second field through the traveling route in accordance with a second manipulation. The program still further causes the computer system to function as a normal mover that moves the player character in any one of the first and second fields in which the player character is present in accordance with the instruction input from the normal movement input unit. The program still further causes the computer system to function as a movement restriction switching unit that switches a status of the game between a cross-field movement disabled state, in which the player character is not allowed to move from the first field to the second field, and a cross-field movement enabled state, in which the player character is allowed to move from the first field to the second field, in accordance with conditions established during progress of the game. The program still further causes the computer system to function as a cross-field movement enable/disable determiner that determines whether the status has been switched to the cross-field movement enabled state by the movement restriction switching unit when the player character is moved by the normal mover to a certain region set based on a position of the traveling route within the first field. The program still further causes the computer system to function as a cross-field movement enable/disable display unit that displays cross-field movement enable/disable information indicating whether the player character is allowed to moved from the first field to the second field on the display based upon the determination made by the cross-field movement enable/disable determiner. The program still further causes the computer system to function as a cross-field mover that moves the player character from the first field to the second field when an instruction for moving the player character from the first field to the second field is input from the cross-field movement input unit and when the cross-field movement enable/disable determiner determines that the status has been switched to the cross-field movement enabled state. The program still further causes the computer system to function as a cross-field movement prohibiting unit that keeps the player character within the first field without moving the player character to the second field when an instruction for moving the player character from the first field to the second field is input from the cross-field movement input unit and when the cross-field movement enable/disable determiner determines that the status has been switched to the cross-field movement disabled state.

Further, according to the fourth aspect of the invention, there is provided a computer-readable recording medium in which a program executable on a computer system is recorded, the computer system being connected with a display device for displaying an image representing a status of a game being executed, the game being advanced by moving a player character in a virtual space, including a first field and a second field, the second field opening into the first field via a predetermined traveling route. The recording medium comprises a normal movement input section executable to input an instruction for moving the player character in the virtual space, including the first and second fields, in accordance with a first manipulation. The recording medium further includes a cross-field movement input section executable to input an instruction for moving the player character from the first field to the second field through the traveling route in accordance with a second manipulation. The recording medium further includes a normal mover section executable to move the player character in any one of the first and second fields in which the player character is present in accordance with the instruction input from the normal movement input section. The recording medium further includes a movement restriction switching section executable to switch a status of the game between a cross-field movement disabled state, in which the player character is not allowed to move from the first field to the second field, and a cross-field movement enabled state, in which the player character is allowed to move from the first field to the second field, in accordance with conditions established during progress of the game. The recording medium further includes a cross-field movement enable/disable determiner section executable to determine whether the status has been switched to the cross-field movement enabled state by the movement restriction switching section when the player character is moved by the normal mover to a certain region set based on a position of the traveling route within the first field. The recording medium further includes a cross-field movement enable/disable display section executable to display cross-field movement enable/disable information indicating whether the player character is allowed to move from the first field to the second field on the display based upon the determination made by the cross-field movement enable/disable determiner section. The recording medium further includes a cross-field mover section executable to move the player character from the first field to the second field when an instruction for moving the player character from the first field to the second field is input from the cross-field movement input section and when the cross-field movement enable/disable determiner section determines that the status has been switched to the cross-field movement enabled state. The recording medium further includes a cross-field movement prohibiting section executable to keep the player character within the first field without moving the player character to the second field when an instruction for moving the player character from the first field to the second field is input from the cross-field movement input section and when the cross-field movement enable/disable determiner section determines that the status has been switched to the cross-field movement disabled state.

BRIEF DESCRIPTION OF THE DRAWINGS

FIG. 4 is a room data table used in a video game according to an embodiment of the invention;

DETAILED DESCRIPTION OF THE PREFERRED EMBODIMENTS

Embodiments of the present invention are hereinafter described with reference to the appended drawings.

Figure 1:
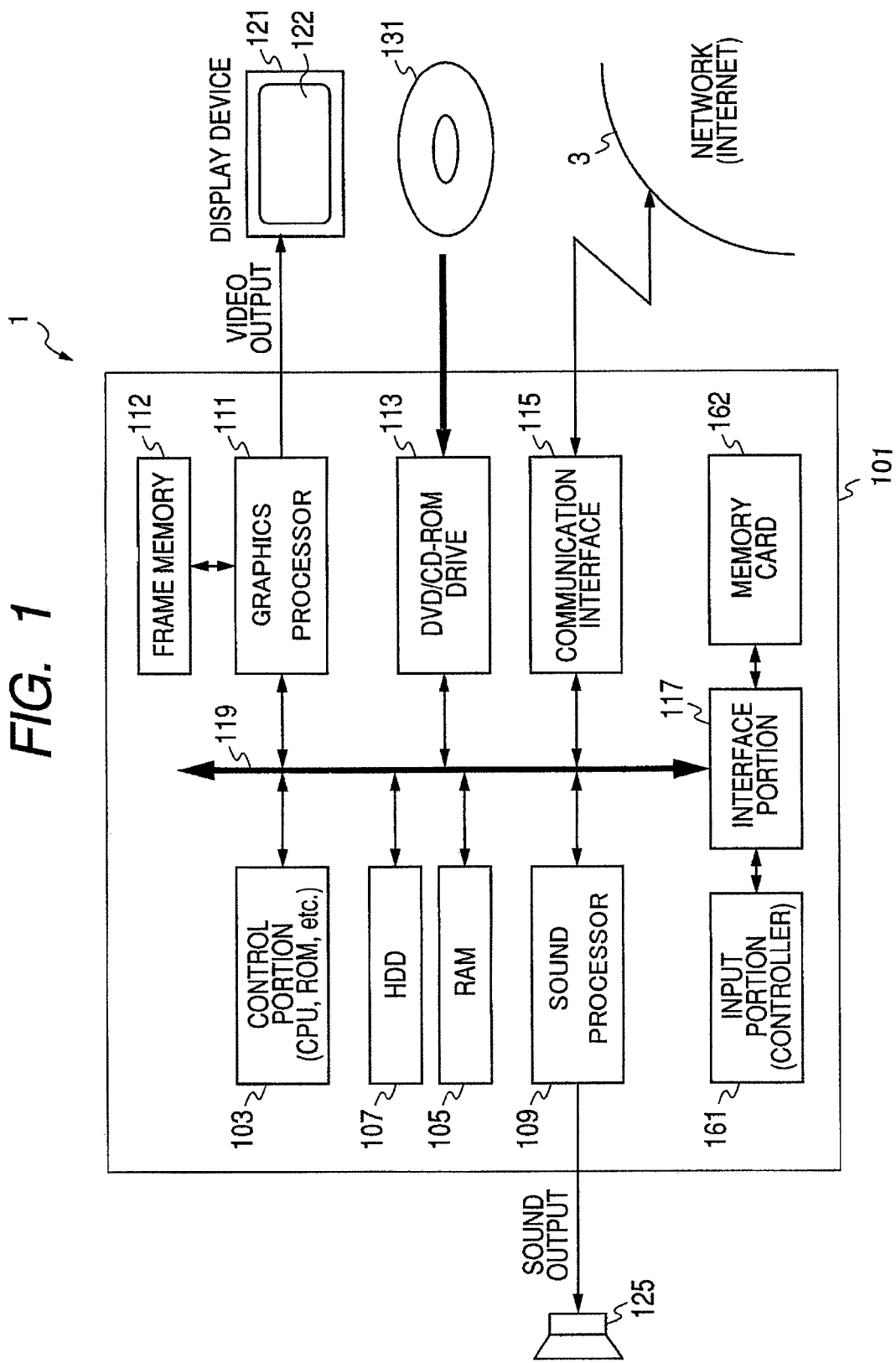
FIG. 1 is a block diagram showing a configuration of a video game apparatus according to an embodiment of the invention.

FIG. 1 is a block diagram showing a configuration of a video game apparatus 1 for executing a three-dimensional video game according to an embodiment of the invention. As shown, the video game apparatus 1 includes a game machine main body 101. The game machine main body 101 includes a control portion 103, a random access memory (RAM) 105, a hard disk drive (HDD) 107, a sound processor 109, a graphics processor 111, a DVD/CD-ROM drive 113, a communications interface 115, and an interface portion 117. All of the components are connected via an internal bus 119.

The sound processor 109 of the game machine main body 101 is connected to a sound output device 125 which is a loudspeaker, for example. The graphics processor 111 is connected to a display device 121 having a display screen 122. A recording medium (DVD-ROM or CD-ROM in the present embodiment) 131 can be loaded into the DVD/CD-ROM drive 113. The communications interface 115 is connected to a network 3. An input portion (such as, for example a game controller) 161 and a memory card 162 are connected with the interface portion 117.

The control portion 103 includes a central processing unit (CPU), a read only memory (ROM) and the like. The control portion 103 executes a program stored in the HDD 107, or recording medium 131, and controls the game machine main body 101. The control portion 103 has an internal timer. The control portion 103 has a function of prohibiting acceptance of inputs. During the prohibition of the acceptance of inputs, processing is performed while not accepting inputs from the input portion 161.

The RAM 105 is a working area for the control portion 103. The HDD 107 provides storage areas for storing programs and data. When a program executed by the control portion 103 gives an instruction to produce an output sound, the sound processor 109 interprets the instruction and delivers a sound signal to the sound output device 125.

The graphics processor 111 draws an image in a frame memory (frame buffer) 112 according to a drawing instruction output from the control portion 103, and outputs a video signal to display images on the display screen 122 of the display device 121. Although the frame memory 112 is shown to be outside the graphics processor 111 in the figure, it may be mounted in the RAM contained in a chip constituting the graphics processor portion 111. One frame period of an image included in a video signal output from the graphics processor is set to, for example, 1/30 second. The graphics processor 111 draws one image per frame time, i.e., 1/30 second, in this embodiment. However, the processor may draw images at different refresh rates, including, for example, 1/25 seconds per frame, or any other appropriate display rate as the skilled artisan will readily appreciate without departing from the spirit and/or scope of the invention.

The DVD/CD-ROM drive 113 reads programs and data from the recording medium 131. The communications interface 115 is connected to the network 3 and communicates with other computers. The input portion 161 includes direction keys and plural control buttons. A player character (described later) is moved by manipulating the direction keys. A desired operation such as, for example, to cause the player character (described later) to open the door, may be performed by manipulating the control buttons. The direction keys may also be used for moving the cursor and for navigating and manipulating messages. The control buttons may also be used to enter a desired instruction.

The interface portion 117 receives the input data from the input portion 161 and outputs the data to the RAM 105. The control portion 103 interprets the data and executes an arithmetic operation. The interface portion 117 also stores data representing the progress of the game stored in the RAM 105, in the memory card 162 based on an instruction from the control portion 103. The interface portion 117 reads data of an interrupted game stored in the memory card 162, and transfers the read-out data to the RAM 105.

A program and data for executing a game on the video game apparatus 1 are first stored, for example, in the recording medium 131. The program and data are read out by the DVD/CD-ROM drive 113, and loaded into the RAM 105 at the time of execution. The control portion 103 processes the program and data loaded in the RAM 105, outputs a drawing instruction to the graphics processor 111, and outputs an instruction for outputting a sound to the sound processor 109. Intermediate data during execution of a process performed by the control portion 103 is stored in the RAM 105.

In the video game apparatus 1, the RAM 105, HDD 107, recording medium 131, and memory card 162 form levels of storage hierarchy. Of these components, the RAM 105 has the highest data readout rate. The HDD 107 has the next highest data readout rate. The control portion 103 reads data necessary for the game in progress from the RAM 105 having the highest readout rate, and performs processing. Since the RAM 105 having the highest data readout rate has a storage capacity smaller than the capacities of the HDD 107 and recording medium 131, only necessary data is divided into segments and loaded into the RAM 105 from the recording medium 131 according to the game progress as described later.

In the video game according to this embodiment, there is provided a map serving as a space in which a player character can move in a virtual space, and the map is made of multiple rooms (for example, four rooms A to D in this embodiment). The player advances the game while moving the player character on the map by manipulating the input portion 161.

Figure 2:
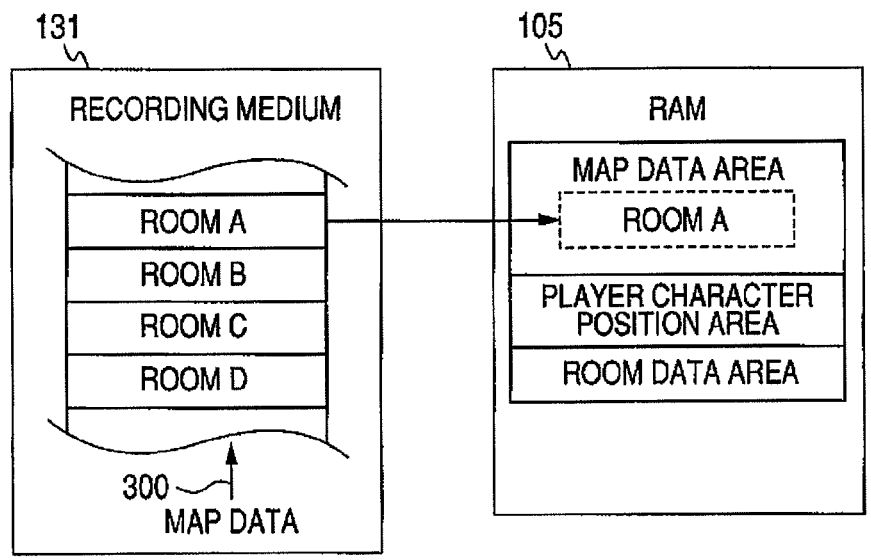
FIG. 2 is a schematic diagram showing a relationship between a configuration of storage areas in a RAM and map data stored in a recording medium according to an embodiment of the invention.

Map data of the respective rooms is stored in the recording medium 131 and read into the RAM 105 according to an instruction from the control portion 103. Then, the data is displayed on the display screen 122. The configuration of the RAM 105 and the data read-out processing from the recording medium 131 will be described next. FIG. 2 schematically shows the relationship between the configuration of the storage areas of the RAM 105 and map data 300 stored in the recording medium 131.

As shown, the map data 300 of each room is stored in the recording medium 131. Each room has a door leading to other rooms as described later. The map data 300 of each room includes data for display of the doors provided in the room.

The RAM 105 has plural storage areas, including a map data area, a player character position data area, and a room data area. The map data area stores the map data of the room in which the player character is positioned, which map data is read from the recording medium 131. The player character position data area stores a position of the player character on the map. The room data area stores a room data table, which will be described later.

When the game starts, the player character is positioned in a room set as an initial value. If the game is restarted from an interrupted status, the player character is placed in the room where the character was at the time of the interruption. The control portion 103 reads from the recording medium 131 the map data 300 indicating the room in which the player character should be positioned, and stores the data in the map data area. Images are displayed on the display screen 122 based upon the stored map data 300 of the room.

The player character can acquire an item if the player performs a predetermined manipulation using, for example, the input portion 161, when the character arrives at a desired position on the map. In this case, the item may be held in a treasure, or the like. The player character can acquire the item when the player performs a predetermined manipulation of the input portion 161 to open the treasure chest. Furthermore, the player character may obtain an item by winning a battle against an enemy character. Otherwise, the character may purchase an item in a shop.

In this embodiment, items that the player character can acquire include items that can be continually used such as, for example, weapons and protectors worn and/or carried with the player character and a key used for opening the door. The items may also include a consumable item that is consumed in one operation, but which is useful for the game progress. Furthermore, items include information (such as, for example, a location where a key is present), which does not have a physical shape in the virtual space, but which is useful for the progress of the game.

Figure 3:
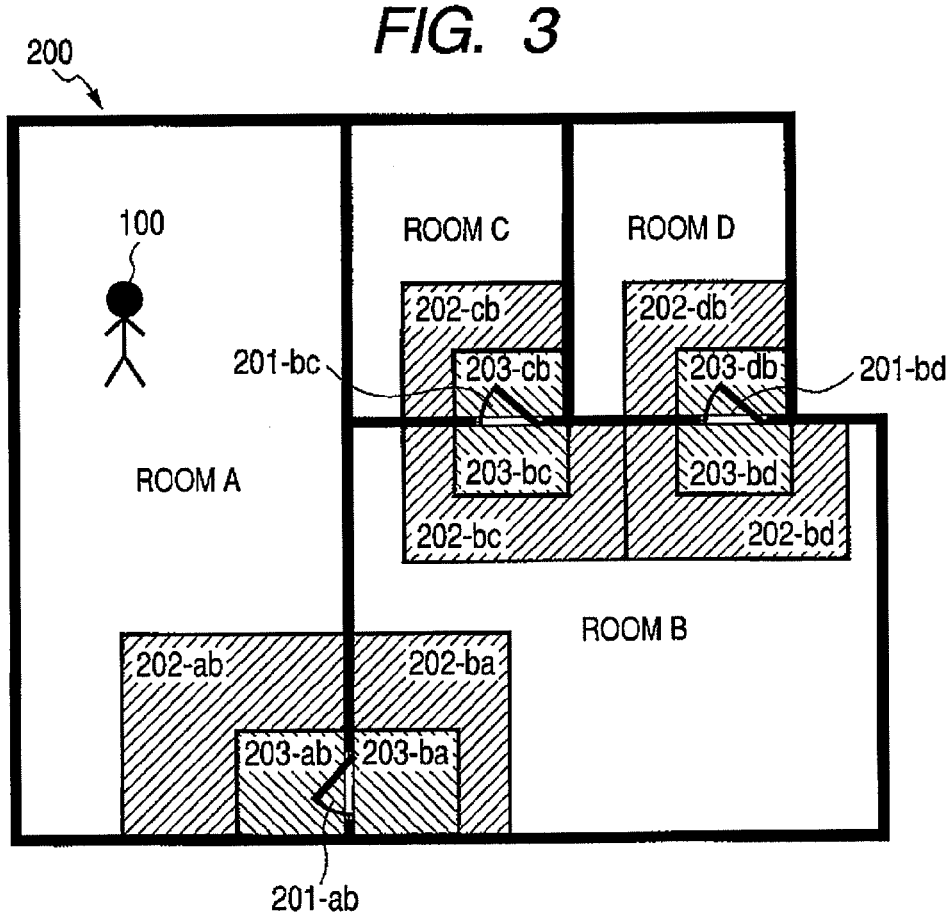
FIG. 3 is a diagram showing an example of a map used in a video game according to an embodiment of the invention.

FIG. 3 is a diagram showing an example of a map used in a video game according to this embodiment. As shown, four rooms (rooms A to D) are formed on a map 200. Positions on the map 200 are represented, for example, by X and Y coordinates. Any room can be uniquely identified by determining a position on the map.

As shown in FIG. 3, a player character 100 can move into another room (e.g., room B) from the present room (e.g., room A), on the map 200, through a door 201 (hereinafter "door 201" refers to one or more of doors 201-*ab*, 201-*bc*, 201-*bd*). The door 201 can assume one of three states: a locked state, an unlocked state, and an open state. In the locked or unlocked states, the door 201 is closed. During normal times, the door 201 is closed. The door can be opened in accordance with an instruction from the player using the input portion 161. To open the door 201, it is first necessary to unlock the door 201. To unlock the door 201, the player character 100 may be required to satisfy one or more conditions required for unlocking the door 201 during the game progress.

Each of the rooms A, B, C, and D leads to other rooms via one or more doors 201 (201-*ab*, 201-*bc*, 201-*bd*). Advance notice areas are set in a given range near each door. Since the advance notice areas are formed in rooms on both sides of each door 201, there are twice as many advance notice areas as there are doors 201. The advance notice areas are set based on the positions of the doors 201. Each of the advance notice areas includes a first area 202 and a second area 203. In the case where the player character 100 is present in any one of the advance notice areas, advance notice information indicating that the player character 100 is in the advance notice areas is displayed on the display screen 122.

In FIG. 3, the first area 202 (hereinafter "202" refers to one or more of areas 202-*ab*, 202-*ba*, 202-*bc*, 202-*cb*, 202-*bd*, 202-*db*) and second area 203 (hereinafter "203" refers to one or more of areas 203-*ab*, 203-*ba*, 203-*bc*, 203-*cb*, 203-*bd*, 203-*db*), which are set for each of the rooms for each of the doors 201, are shown for explanatory purposes. However, it is not necessary to display information (such as, for example, boundaries), indicating whether they are advance notice areas on the display screen 122.

For example, the room A is adjacent to the room B, and a player may move between the rooms through the door 201-*ab*. The first area 202-*ab* and the second area 203-*ab* are set as advance notice areas in the room A. In room B, for example, the first area 202 for the door 201-*bc* has a portion overlapping a part of the first area 202 for the other door 201-*bd*. The second area 203 for one door does not overlap with the second area 203 for any other doors 201.

Where the player character 100 is outside the advance notice areas of each room, no advance notice information is displayed. Where the player character 100 is in the first area 202, a symbol "!", for example, is displayed as advance notice information over the head of the player character 100. Furthermore, where the player character 100 is in the second area 203, a symbol set "!!", for example, is displayed as advance notice information over the head of the player character 100.

When the player character is present in the second area 203-*ab*, the door 201-*ab* can be opened if the player manipulates, for example, a circle button on the input portion 161. Thus, the player character 100 can be moved from the present room A to the other room B through the door 201-*ab*. In order to open the door 201, it is necessary for the player character 100 to satisfy the conditions required for unlocking the door 201, such that the door 201 becomes unlocked, or has already been unlocked. The conditions for unlocking the door are stored in a room data table (described later). In the second area 203, information indicating whether the door 201 is in an unlocked state is also displayed as advance notice information, for example, over the head of the player character 100.

FIG. 4 shows an example of the room data table necessary for displaying the advance notice information. Room data table 400 is stored in the aforementioned room data area. More specifically, at the beginning of a game, room data table 400 is loaded into RAM 105 from the recording medium 131. When the game is interrupted, the room data table is loaded into the memory card 162 from the RAM 105. When the game is restarted, the room data table is loaded into the RAM 105 from the memory card 162.

As shown, the room data table 400 includes three major kinds of data, that is, room data, advance notice data, and destination data. These three kinds of data correspond to each other. The room data includes a room identification (ID), area information, and a search flag. The ID indicates information that uniquely identifies each room. The area information indicates an area on the map 200 (e.g., in FIG. 3) of a room by, for example, using a range of coordinates. The search flag indicates whether the player character has moved out of the advance notice areas in the corresponding room. In the initial state, the search flag is set to "0". When the player character 100 moves into another room and goes out of the advance notice areas, the flag is set to "1". Once the flag is set, the flag is not reset to "0". The font color of the advance notice information (described later) varies according to whether the flag is set for a destination room.

The advance notice data includes door position information, data of the advance notice areas, a non-display flag, an unlocking flag, unlocking conditions, and a comment. The door position information indicates the position of the door 201 that serves as a traveling route between rooms on the map 200 in terms of coordinates. The first advance notice area data and the second advance notice area data indicate areas in which symbols "!" and "!!" are respectively displayed as the advance notice information on the map 200 in terms of coordinates. The non-display flag indicates whether the advance notice information can be displayed on the display screen 122.

When the player character 100 moves from the second area 203 to a new room through the door 201, the non-display flag is set in association with the door 201 through which the player character passed through to get to the new room. When the character goes out of the first and second advance notice areas of the door 201 for which the flag has been set, the non-display flag is erased. When the player character moves into a new room, the non-display flags for the data relating to the other room and/or other door 201 are erased and reset to "0". When the game is started, all of the non-display flags have a value of "0".

For example, where the player character 100 moves into the room B from the second area 203-*ab* of the room A through the door 201-*ab*, the non-display flag corresponding to the door 201-*ab* of the destination room B is set. At the same time or substantially the same time, the other non-display flags are all erased. When the player character 100 subsequently goes out of the first area 202-*ba* of the room B, the non-display flag corresponding to the door 201-*ab* of the room B is also erased.

The unlocking flag is set when the door 201 becomes unlocked. The unlocking flag for a door 201, for which unlocking conditions are not established, is set from the initial state. The unlocking conditions are necessary to permit the character to unlock the locked door 201 from a given room. The unlocking conditions may include, for example, the player character 100 carrying an item such as a key, an action to be performed by the player character 100 to unlock the door 201, and a hit point (HP) or experiential value of the player character 100 necessary for opening the door 201.

The experiential value is incremented every time the player character completes an event (including a battle with an enemy character) set along the progress of the game. The experimental value is stored in a given area of the RAM. Furthermore, information of the item(s) presently possessed by the player is stored in a given area of the RAM. With respect to a door, for which these parameters have been set as unlocking conditions, the unlocking flag is set (i.e., if the unlocking flag has not yet been set) when the player performs an operation for opening the door 201, provided that the information stored in the RAM reveals that the unlocking conditions are satisfied. Furthermore, in a case where a predetermined operation is specified as the unlocking condition, the unlocking flag may be set at the instant when the player character performs that operation.

Where the player character 100 does not satisfy the unlocking conditions for the door 201, the comment gives the player a hint of the unlocking conditions. The comment may be a direct, simple hint such as, for example, "* key is needed". It may also be an indirect hint such as, for example, "a button should be present anywhere," urging the player to search for the button. In addition, the comment may be a detailed instruction such as, for example, a place and an action to be taken such as "* key is needed. Go to xxx and get the key."

The comment is displayed on the display screen 122 when the player character 100 is present in the second area 203 for the door 201 and the player performs a predetermined manipulation of the input portion 161, such as, for example, actuation of the circle button of the input portion 161 (i.e., if the unlocking conditions for the door 201 have not been satisfied). If the unlocking flag is set, it is determined that the unlocking conditions are satisfied.

Where the player character 100 is present in the second area 203, a method of manipulating the input portion 161 is shown irrespective of whether the unlocking conditions for the corresponding door 201 are satisfied. That is, if the unlocking conditions are satisfied, the door 201 can be opened, and the character can move to an adjacent room. Therefore, a message indicating a method for opening the door 201 (hereinafter referred to as the door manipulating method) (i.e., to open the door using, for example, the circle button) is displayed. In this case, if the search flag is set for the destination room, the font color of the message is changed from a normal color of black to red. Meanwhile, if the unlocking conditions have not been satisfied, it is necessary to first satisfy the unlocking conditions to unlock the door 201. Therefore, a manipulation method for displaying the comment regarding the unlocking conditions (hereinafter referred to as the comment manipulation method) (i.e., display comment with the circle button) is displayed.

Data of the destination location contains a room ID and positional information. The room ID is information indicating a destination room to which the character moves from the present room through the door 201. The positional information is information about coordinates on the map 200 on which the player character 100 is placed after movement, and indicates the second area 203 within the room into which the character has moved.

Processing for advancing the video game according to the present embodiment is hereinafter described. However, an explanation for the processing executed by the control portion 103 and the graphics processor 111 for generating an image according to the game progress every frame period, and displaying the image on the display screen 122, will be omitted because this processing is not different from the conventional one. In the following description, what is described as processing displayed on the display screen 122 is used to generate an image every frame. A description of processing other than the processing specific to this embodiment is omitted. Further, information about intermediate results (including information about contents to be displayed) obtained during the processing performed by the control portion 103 is temporarily stored in the working area of the RAM 105.

When the game machine main body 101 of the video game apparatus 1 is powered on, an initial option window menu is displayed on the display screen 122 to determine whether the video game is started from the beginning, or the game is restarted from an intermediate point. The player manipulates the input portion 161 according to the initial option window menu and determines whether the game is to be started from the beginning or the game is to be restarted from an intermediate point. Where the option for starting the game from the beginning is selected, initial data is loaded into the RAM 105 from the recording medium 131. Where the option for restarting the game from the intermediate point is selected, data saved at the time of interruption is loaded from the memory card 162 into the RAM 105, and processing of the game is started. The initial data and the saved data contain the room data table 400 and the position of the player character. Map data 300 of the corresponding room is loaded into the RAM 105 from the recording medium 131 based on the position of the player character contained in the initial data, or the saved data.

Figure 5:
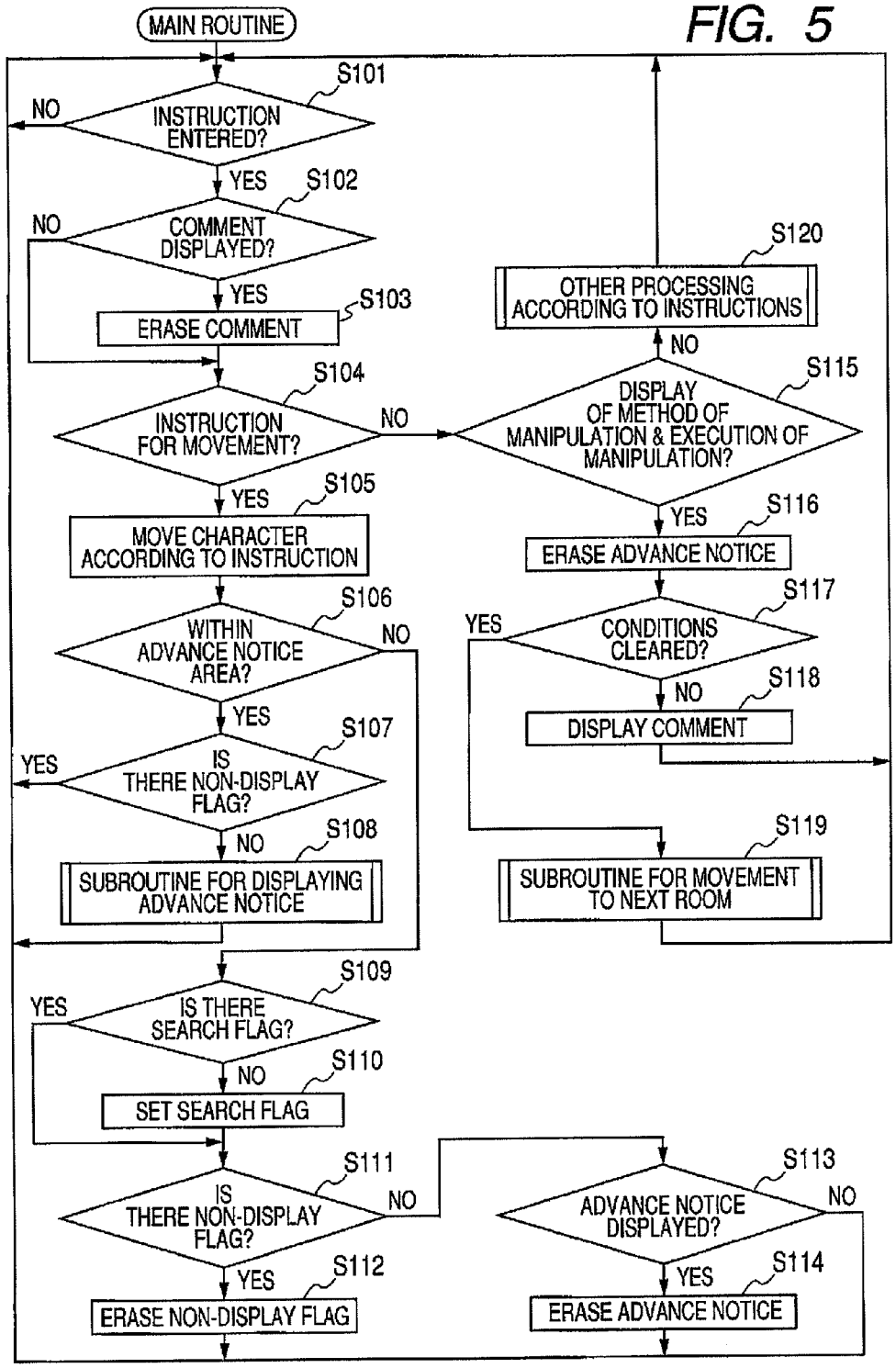
FIG. 5 is a flowchart illustrating a main process of a video game according to an embodiment of the invention.

FIG. 5 is a flowchart illustrating the main processing in the video game according to the present embodiment. In the main processing, the control portion 103 decides whether a player's instruction has been input from the input portion 161 (step S101). The control portion 103 repeats the processing of step S101 ("No" in step S101) until a player's instruction is input from the input portion 161 ("Yes" in step S101). Thus, the control portion waits for the player to input any instruction.

Where a player's instruction is input from the input portion 161 ("Yes" in step S101), the control portion 103 decides whether a comment is displayed on the display screen 122 (step S102). If the decision is affirmative ("Yes" in step S102), it follows that the player character 100 present in the second area 203 does not satisfy the unlocking conditions for the door 201. The control portion 103 erases the displayed comment in response to an input of a new instruction (step S103). Then, the processing goes to step S104. If no comment is displayed ("No" in step S102), the processing proceeds directly to step S104.

In step S104, the control portion 103 decides whether the input instruction requires the player character 100 to be moved. If the decision is affirmative ("Yes" in step S104), the control portion 103 moves the player character 100 on the map 200 (step S105). If the direction of motion given by the instruction input from the input portion 161 is different from the direction to which the player character 100 faces, the control portion 103 first turns the player character 100 to the direction of motion given by the input instruction. After the player character 100 faces the direction of motion given by the input instruction, the control portion 103 moves the player character 100 in this direction.

Then, the control portion 103 decides whether the player character 100 has moved into the advance notice areas stored in the room data table 400 (step S106). If the player character 100 has moved into the advance notice areas (including the first and second areas) ("Yes" in step S106), the control portion 103 decides whether the non-display flag for the door 201 corresponding to the advance notice areas is set (step S107). If the flag is set ("Yes" in step S107), it means that the player character 100 is present within the advance notice areas but does not go out of the advance notice areas corresponding to the door 201 after moving to the present room through the door 201. Therefore, the processing returns to step S101 without displaying advance notice information.

Meanwhile, if the non-display flag is not set ("No" in step S107), the control portion 103 performs the processing for displaying the advance notice indicating that there is a door 201 that can be opened by satisfying the unlocking conditions in a position close to the player character 100 (step S108). This processing for displaying the advance notice will be described in detail later. When this processing for displaying the advance notice ends, the processing returns to step S101.

If it is determined that the player character 100 has not moved into the advance notice areas ("No" in step S106), the control portion 103 determines whether the search flag corresponding to the room is set (step S109). If the search flag is not set ("No" in step S109), it means that the player character 100 has moved out of the advance notice areas within the room. Therefore, the search flag for the room is set (step S110). Then, the processing proceeds to step S111. If the search flag has already been set ("Yes" in step S109), the processing proceeds directly to step S111.

In step S111, the control portion 103 determines whether the non-display flag for the door 201 is set. If the flag is set ("Yes" in step S111), the control portion 103 erases the non-display flag (step S112). Since the non-display flag is erased at this time, it is determined that the player character 100 has gone out of the advance notice areas corresponding to the door 201 after moving to the present room through the door 201. The advance notice information can be displayed on the display screen 122. Then, the processing proceeds to step S101.

Meanwhile, if the non-display flag is not set ("No" in step S111), the control portion 103 decides whether the advance notice information (such as, for example, "!", "!!", the door manipulating method, or the comment manipulation method) is being displayed on the display screen 122 (step S113). If the advance notice information is not being displayed ("No" in step S113), the control portion returns to the processing of step S101. If the advance notice information is being displayed ("Yes" in step S113), the control portion 103 erases the displayed advance notice information from the display screen 122 (step S114). Then, the processing returns to step S101.

If the input instruction is not an instruction for movement ("No" in step S104), the control portion 103 determines whether the door opening method, or the comment manipulation method, is displayed on the display screen 122, and whether the input instruction corresponds to the displayed manipulation (i.e., manipulation of the circle button) (step S115). If an input is made by actuating the circle button ("Yes" in step S115), the control portion 103 erases the display of the advance notice information on the display screen 122 (step S116), and determines whether the player character 100 satisfies the unlocking conditions under which the player character 100 passes through the door 201 identified in step S208 (described later) (step S117). If at least the unlocking flag is set, it is determined that the unlocking conditions are satisfied.

In the case where the unlocking conditions under which the door 201 is passed through are not satisfied ("No" in step S117), the control portion 103 reads comments on the room and door 201 from the room data table 400 and displays them on the display screen 122 (step S118). Then, the processing returns to step S101. In the case where the unlocking conditions under which the door 201 is passed through have been satisfied ("Yes" in step S117), the control portion 103 performs the processing for causing the character to move from the present room to the next room through the door 201 (step S119). The processing for the movement to the next room will be described in detail later. After the processing for the movement to the next room ends, the processing returns to step S101.

Figure 6:
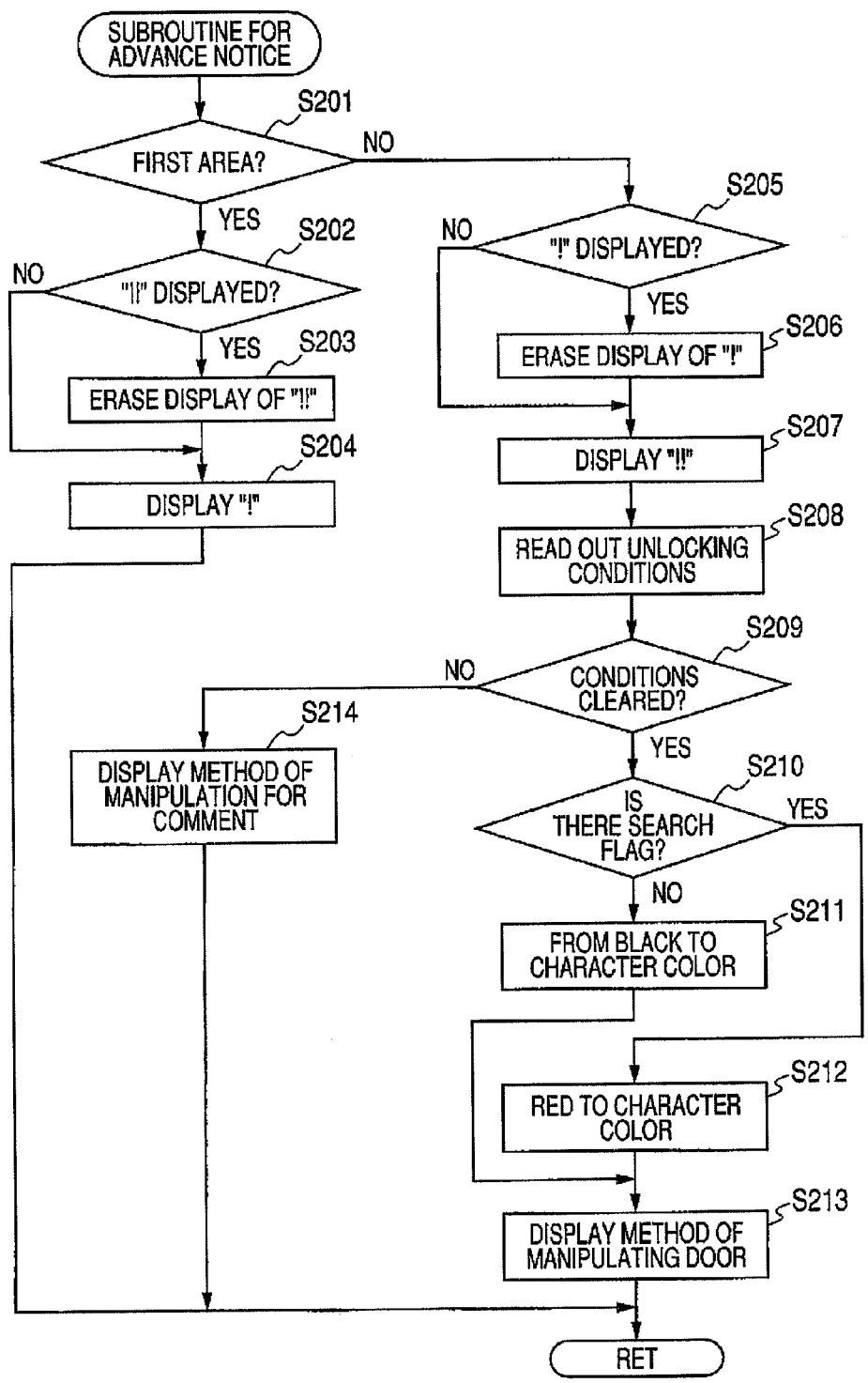
FIG. 6 is a flowchart illustrating a process for displaying advance notice of FIG. 5.

On the other hand, in the case where the input instruction is not an instruction responsive to the manipulation displayed on the display screen 122 ("No" in step S115), the control portion 103 performs various kinds of processing corresponding to the contents of the instruction (step S120). In the case where the given operation of the player character 100 is set as the unlocking conditions for a certain door, when the player character 100 performs this operation during this processing, an operation for setting the unlocking flag for the door is contained in the processing. Other processing is carried out, but because it does not directly relate to the present invention, its detailed description is omitted. Then, the processing returns to step FIG. 6 is a flowchart illustrating a non-limiting example of the processing for displaying the advance notice in step S108. In this processing, the control portion 103 determines whether the player character 100 is in the first area 202 of the map 200 (step S201). If the decision is affirmative ("Yes" in step S201), the control portion 103 determines whether a symbol set "!!" is displayed over the head of the player character 100 on the display screen 122 (step S202).

If the symbol set "!!" is not displayed ("No" in step S202), the processing directly proceeds to step S204. If the symbol set "!!" is displayed ("Yes" in step S202), the control portion 103 erases the displayed symbol set "!!" (step S203). If the door manipulating method or the comment manipulation method is also displayed, these methods are also erased (step S203). Then, the processing proceeds to step S204.

In the step S204, the control portion 103 displays the symbol "!!" over the head of the player character 100 and displays images on the display screen 122. If the symbol "!" is already displayed on the display screen 122, the control portion 103 continues the display of the symbol. Then, the processing for displaying the advance notice ends, and the processing returns to the flowchart of FIG. 5.

If it is determined at step S201 that the player character 100 is not in the first area 202 on the map 200 (i.e., the player character 100 is present in the second area 203 on the map 200) ("No" in step S201), the control portion 103 determines whether the symbol "!" is displayed over the head of the player character 100 on the display screen 122 (step S205). If the symbol "!" is not displayed ("No" in step S205), the processing proceeds directly to step S207. If the symbol "!" is displayed ("Yes" in step S205), the control portion 103 erases the displayed symbol "!" (step S206). Then, the processing proceeds to step S207.

In step S207, the control portion 103 displays a symbol set "!!" over the head of the player character 100 on the display screen 122. If the symbol set "!!" is already displayed on the display screen 122, the control portion 103 continues the display. Then, the control portion 103 identifies the door 201 corresponding to the second area 203 in which the player character 100 is present. The control portion 103 reads the unlocking conditions required for passing through the identified door 201 (step S208), and determines whether the player character 100 satisfies the unlocking conditions (step S209). If an unlocking flag is set for the door 201 corresponding to the second area 203 in which the player character 100 is present, it means that the unlocking conditions are satisfied in step S208.

In the case where the player character 100 satisfies the unlocking conditions for the door 201 ("Yes" in step S209), the control portion 103 refers to the room data table 400 and determines whether a search flag for the room corresponding to the destination room ID of the destination of the door 201 identified in step S208 is set (step S210). If the search flag for the destination room is not set ("No" in step S210), the control portion 103 sets the font color to black (step S211). Then, the processing proceeds to step S213. If the search flag is set ("Yes" in step S210), the control portion 103 sets the font color to red (step S212). Then, the processing proceeds to step S213.

In step S213, the control portion 103 displays the door manipulating method with the font color specified in step S211 or S212 on the display screen 122. Then, the processing for displaying the advance notice ends and the processing returns to the flowchart of FIG. 5.

If the unlocking conditions are not satisfied ("No" in step S209), the comment manipulation method is displayed on the display screen 122 (step S214). Then, the processing for displaying the advance notice ends and the processing returns to the flowchart of FIG. 5.

Figure 7:
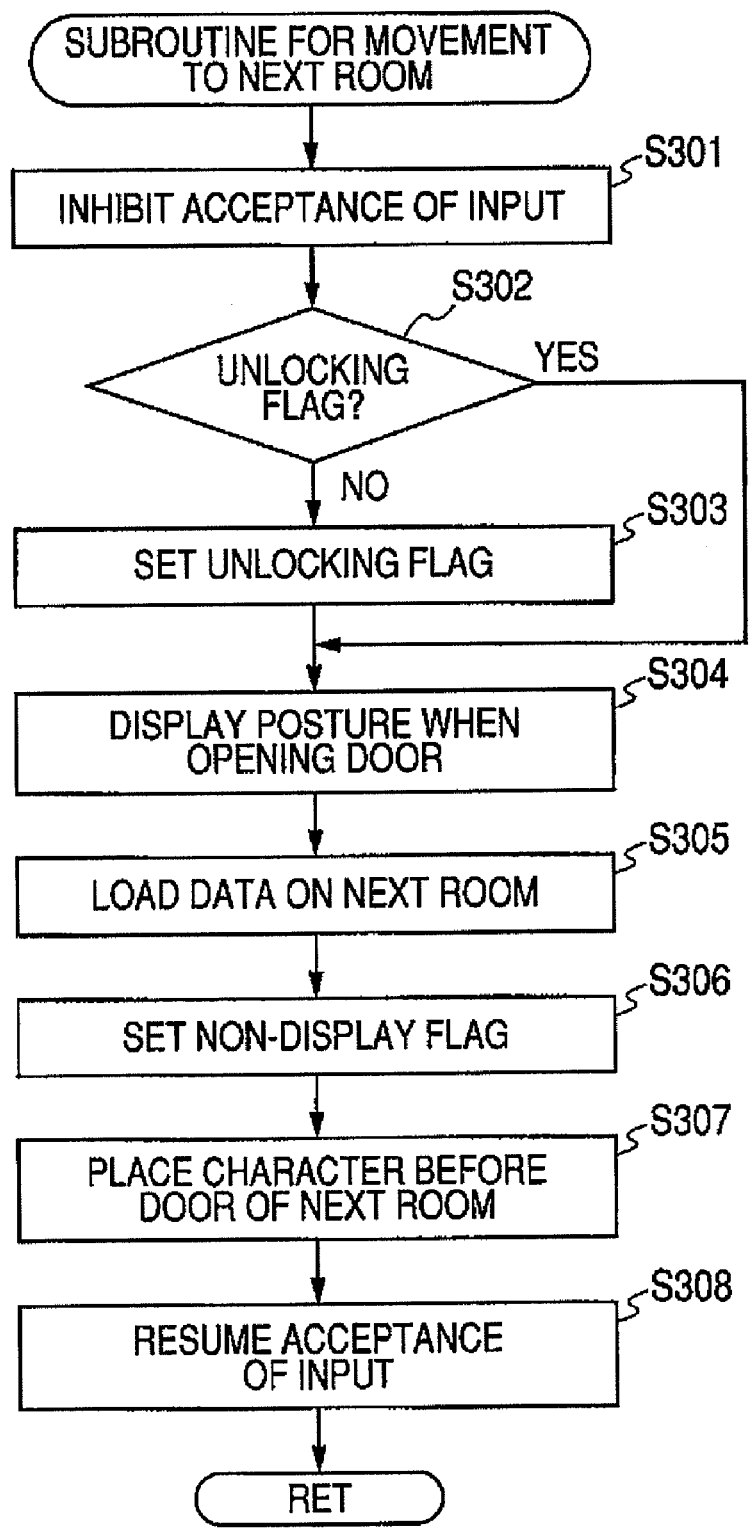
FIG. 7 is a flowchart illustrating a process for movement to a next room of FIG. 5.

FIG. 7 is a flowchart illustrating a non-limiting example of the processing for movement into the next room in step S119.

In this processing, the control portion 103 performs processing for inhibiting acceptance of inputs, i.e., does not accept any player's instruction from the input portion 161 (step S301). Then, the control portion 103 determines whether an unlocking flag is set for the door 201 identified in step S208 (step S302). If the unlocking flag is not set ("No" in step S302), it means that the unlocking conditions have been satisfied but the door 201 is not yet unlocked. Then, the control portion 103 sets the unlocking flag and unlocks the door (step S303). In the case where an item such as, for example, a key is set as the unlocking condition for the door 201, the player character 100 may insert the key into the keyhole. Then, the processing proceeds to S304. If the unlocking flag is set ("Yes" in step S302), the processing proceeds directly to step S304.

In step S304, the control portion 103 displays a posture of the player character 100 who is opening the door 201 on the display screen 122. This processing is used to display a sequence of statuses of the player character 100 who opens the door 201 and so a certain period of time is required. Then, the control portion 103 refers to the ID of the destination room for the door 201 identified in step S208 in the room data table 400, and loads map data 300 of the destination room into the map data area of the RAM 105 from the recording medium 131 (step S305). Since the loading of the map data 300 requires reading the whole map data 300 of the destination room from the recording medium 131, which has a slow data readout rate, and writing the data into the RAM 105, a considerably long time is taken.

Then, the control portion 103 sets the non-display flag corresponding to the door 201 through which the player character has passed in the destination room and clears the non-display flags for all the other rooms and doors 201 in the room data table 400 (step S306). Then, the control portion 103 places the player character 100 at the position indicated by the destination position information about the door 201 identified in step S208 in the room data table 400 (step S307). Here, the door 201 through which the player character has passed is closed and locked, and the player character 100 shows his back to the door 201.

The placed player character 100 is positioned in front of the door 201, through which the player character 100 has passed, and thus is present in a new second area 203. However, the non-display flag is set, and therefore no advance notice information is displayed. Then, the player character 100 moves and exits from the advance notice areas. Consequently, the non-display flag is set to 0. As a result, new advance notice information can be displayed on the display screen 122.

Then, the acceptance of an input that was inhibited in step S301 is restarted such that a player's instruction can be accepted from the input portion 161 (step S308), and the processing for the movement into the next room is ended. The, the processing returns to the flowchart of FIG. 5.

The advance notice information displayed on the display screen in a video game is next described in detail by referring to FIGS. 8A-8G. In any step of FIGS. 8A-8G, the player character 100 is present within the room A. There is a door 201-ab through which movement is made from the room A to the room B. It is assumed that an area from L202-ab to L203-ab is set as a first area 202 for the door 201-ab and an area extending from L203-ab to the door 201-ab is set as a second area 203.

Figure 8A:
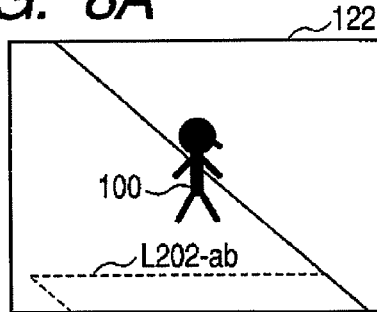
FIGS. 8A-8G are diagrams illustrating images displayed on a display screen on which advance notice information is displayed.
Figure 8B:
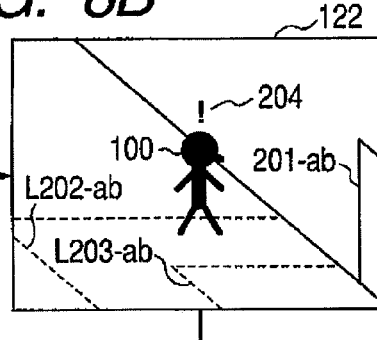

In FIG. 8A, the player character 100 is outside the advance notice areas within the room A. Outside the advance notice areas, no advance notice information is displayed. Furthermore, the door 201 is not displayed at all. Then, the player character 100 is moved into the first area 202 in accordance with a player's instruction from the input portion 161. In this case, as shown in FIG. 8B, the symbol "!" 204 is displayed over the head of the player character 100. At this time, only a part of the door 201-ab is shown.

Furthermore, the player character 100 is moved into the second area 203 in accordance with a player's instruction from the input portion 161. In this case, the advance notice information displayed on the display screen 122 differs according to whether or not the player character 100 satisfies the unlocking conditions for the door 201.

Figure 8C:
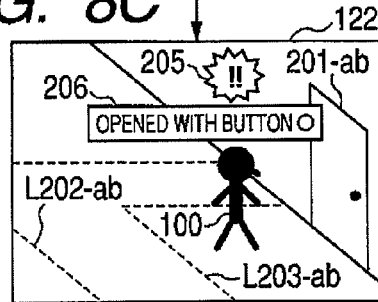

If the unlocking conditions are satisfied, a symbol set "!!" 205 and a door manipulating method 206 are displayed over the head of the player character 100 as shown in FIG. 8C. Here, the door 201-ab is completely displayed. In the case where the player character 100 has never moved out of the advance notice areas of the room through the door 201, the font color of the message of the door manipulating method 206 is black. In the case where the character has moved out of the advance notice areas in the room, the font color is red.

Figure 8D:
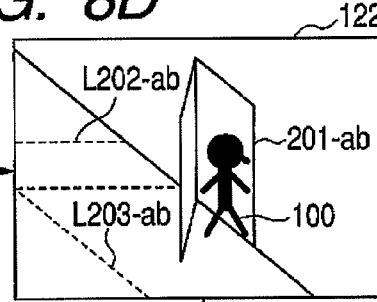
Figure 8E:
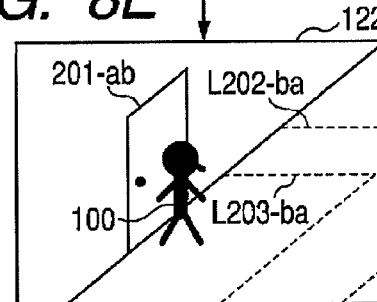

If the player manipulates the circle button that is displayed as the door manipulating method 206, the posture of the player character is displayed as shown in FIG. 8D. That is, the player character 100 opens the door 201 and enters the next room through the door. The posture of the player character 100 who shows his back to the locked and closed door 201 of the next room is displayed on the display screen 122 as shown in FIG. 8E. During the steps of FIGS. 8D-8E, operations of the input portion 161 by the player are nullified.

Figure 8F:
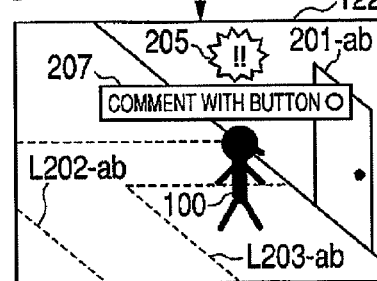
Figure 8G:
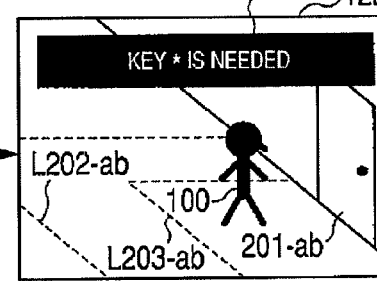

On the other hand, if the player character 100 does not satisfy the unlocking conditions, the set of symbols "!!" 205 and the comment manipulation method 207 are displayed over the head of the player character 100 as shown in FIG. 8F. Here, the door 201-ab is completely displayed. If the player manipulates the circle button in accordance with the comment manipulation method, the set of symbols "!!" 205 and the comment manipulation method 207 are erased. A window 208 displaying a comment corresponding to the door 201 stored in the room data table 400 is displayed at the top of the display screen 122 as shown in FIG. 8G. If the player manipulates the input portion 161 and enters a new instruction, the comment is erased.

As described so far, in the video game according to the present embodiment, the map 200 is provided in the virtual space, which map is made of multiple rooms serving as spaces in which the player character may move. The player character 100 can move from the present room to another room through the door 201. The door may be in one of three states: a locked state, an unlocked state, and an open state. When the door 201 is in a locked or an unlocked state, the door is displayed in a closed state on the display screen 122. At normal times during processing of the game, the door 201 is in a closed state. The door can be opened in accordance with a player's instruction from the input portion 161. In order to open the door 201, it is necessary to first unlock the door 201. This is achieved by the player character 100 by satisfying the unlocking conditions for the door 201.

When it is assumed that information indicating whether the player character 100 satisfies the unlocking conditions for the door 201 is not displayed on the display screen 122, the player needs to enter an instruction for opening the door 201 using the input portion 161 in order to know whether the player character 100 can move to the other room through the door 201. If the player character 100 does not satisfy the unlocking conditions for the door 201, the door 201 will not open. This way, if the door 201 does not open in spite of the fact that the player enters an instruction for opening the door 201, the inputting is useless. In other words, the player has been forced to perform complex manipulations.

On the other hand, in the video game according to this embodiment, if the player character 100 has moved into the second area 203 set based on the position of each door 201, it is determined whether the unlocking conditions for the door 201 are satisfied. If the conditions are satisfied, the door manipulating method is displayed over the head of the player character 100 on the display screen 122. The door manipulating method displayed on the display screen enables the player to recognize that the player character 100 satisfies the unlocking conditions for the door 201 and can open the door 201 without entering an instruction for opening the door 201. Consequently, the player is not required to perform wasteful actions.

The font color of the message displayed on the display screen 122 to explain the door manipulating method is black if the player character 100 did not move out of the advance notice areas within the destination room. If the character moved out of the advance notice areas, the color is red. Therefore, if the player forgets that he moved the player character 100 into a room that was a destination, wasteful motion of the player character 100 into the room can be prevented. Hence, the game can be quickly and smoothly progressed.

When the player character 100 moves into the second advance notice area 203, if the unlocking conditions for the door 201 are not satisfied, a comment manipulation method is displayed over the head of the player character 100 on the display screen 122. The comment manipulation method displayed on the display screen makes it possible for the player to recognize that the player character 100 does not satisfy the unlocking conditions for the door 201 and the door 201 cannot be opened, without entering the instruction for opening the door 201. In consequence, the player is not required to perform wasteful manipulations.

Furthermore, where the player only wants to know whether the player character 100 can be moved from the present room to another room, the player does not need to move the player character 100 to the other room in view of the game progress. The player is able to recognize whether the player character can move to the other room from the door manipulating method and the comment manipulation method displayed on the display screen 122, without the actual manipulation for opening the door. Therefore, in the case where the player only wants to know whether the player character 100 can move from the present room to the other room, it is not required to perform wasteful manipulations. Since the player is not required to perform wasteful manipulations for moving the player character 100 from the present room to another room in this way, the game can be advanced smoothly.

The advance notice areas have two areas: the first area 202 and the second area 203. When the player character 100 has moved into the first area 202, which is relatively remote from the door 201, the symbol "!" (i.e., advance notice information) is displayed over the head of the player character 100. When the character has moved into the second area 203, which is relatively close to the door 201, the symbol set "!!" (i.e., advance notice information) is displayed over the head of the player character 100. That is, advance notice information is displayed at two different stages on the advance notice areas.

In this embodiment, even in the case where the door 201 is not sufficiently or clearly displayed on the display screen 122, the display of the symbols "!" and "!!", which are kinds of advance notice information, makes it possible for the player to know the presence of the door 201. Even if the player character 100 is in the first area 202 and the door 201 is not sufficiently clearly displayed, the player can easily know of the presence of the door. Furthermore, even where the door 201 is a hidden door, the player can understand that the player character has moved close the door 201 if the symbol set "!" is displayed after display of the symbol "!!". If the symbol "!!" is displayed after display of the symbol set "!", the player can recognize that the player character has moved further away from the door 201. Since the advance notice information is displayed when the player character is in the advance notice areas in this way, the player can advance the game without missing the door 201, and thereby can fully enjoy the game.

In the case where the player character 100 has moved and the comment manipulation method is displayed on the display screen 122, a hint for unlocking the door 201 is displayed by performing the manipulation corresponding to the comment manipulation method. In this way, the player can check conditions required for moving to another room by performing a given manipulation even in the case where the door 201 is locked and the character cannot be moved to the other room. Consequently, the game can be quickly advanced.

In this embodiment, when the player character 100 is in front of the unlocked door 201, if the player manipulates the circle button of the input portion 161, the player character 100 moves to another room through the door 201. When moving to the other room, processing is performed in such a way that the player character 100 opens the door 201. This processing needs a given period of time. Furthermore, since the map data 300 is prepared for each different room and loaded into the RAM 105, processing is necessary for loading the map data 300 for a new destination room from the recording medium 131 into the RAM 105. This processing requires a considerably long time to perform.

If information is not displayed on the display screen 122, allowing the player to determine whether the door 201 is unlocked or not, such as the door manipulating method or the comment manipulation method as in the present embodiment, the player must manipulate the circle button of the input portion 161 only to know whether the door 201 can be opened. In such a case, if the door 201 is in an unlocked state, the player character 100 is moved through the door 201 to the other room, irrespective of whether the player only wants to know whether the door 201 can be opened or wants to move the player character 100 to other room.

Here, a player's next instruction for advancing the game cannot be accepted until the operation of the player character 100 for opening the door 201 and the loading of the map data 300 of the destination room from the RAM 105 are completed. Even in the case where the player only wants to know whether the door 201 can be opened, he must wait for progress of the game during the above processing. In addition, if the character should be returned to the original room, the same processing needs to be repeated again. This doubles the period of time for which the player must wait for progress of the game.

On the other hand, in the game according to the present embodiment, if the player character 100 moves to the second area 203 close to the door 201, the door manipulating method, or the comment manipulation method, is displayed. This enables the player to know ahead of time whether the door 201 is in an unlocked state, without having to perform a manipulation (such as, for example, an input using the circle button) to open the door 201. If the player only wants to know whether the door 201 can be opened, information that the player wants to know is fully offered in this embodiment. Thus, since the manipulation for opening the door 201 is not performed, the player is not required to wait for progress of the game for a long time to display the operation for the player character 100 to open the door 201 and to load the map data 300 of the room on the opposite side of the door 201. Consequently, the player can quickly and smoothly advance the game.

In the game according to the present embodiment, the virtual space in which the player character 100 moves has plural doors 201 providing traveling routes between different rooms. The player only needs to perform the same manipulation (e.g., manipulating the circle button of the input portion 161) irrespective of which door 201 is to be opened. Furthermore, in the case where there are many doors, all of which can be opened with the same manipulation, the door manipulating method, indicating a manipulation for opening each door 201, is information that is obvious to the player. Displaying the door manipulating method whenever the player character 100 moves into the second area 203 may be a nuisance to the player. Furthermore, although the comment manipulation method is also displayed, as in the case of the door manipulating method, if the comment is automatically displayed under the condition where the door 201 is locked and thus is not opened, displaying the comment manipulation method that teaches the conditions for unlocking the door to the player may also be a nuisance to the player.

Meanwhile, if the player still does not know whether the door 201 in front of the player character 100 can be opened under the condition where neither the door manipulating method nor the comment manipulation method is displayed, the player must actually perform a manipulation for opening the door 201 to know whether it can be opened. Obviously, performing a manipulation for opening the door 201 that cannot be opened is a nuisance to the player. However, it cannot be said that the manipulation is a nuisance to the player if the comment on the unlocking conditions is displayed when the door 201 cannot be opened. For this reason, not displaying either the door manipulating method or the comment manipulation method may cause fewer nuisances to the player.

However, only if the player manipulates, for example, the circle button to find out whether the door 201 can be opened, must the player wait for advancing the game by having to wait for the processing of the player character 100 for opening the door and the processing of loading the map data 300 of the destination room into the RAM 105 to complete. When the game advance is suspended for such a long time, smooth progress of the game is hindered. This causes maximum nuisance to the player. In the game according to the present embodiment, the door manipulating method and the comment manipulation method are purposely displayed. Although displaying the methods may seem like a nuisance to the player, this prevents the player's wasteful manipulations. Consequently, interruption of the progress of the game, which is the greatest nuisance, is prevented. Hence, quick and smooth progress of the game is achieved.

It is to be understood that the present invention is not limited to the above embodiments and that various changes, modifications and applications are possible. Some exemplary, non-limiting modifications of the above embodiments of the invention are hereinafter described.

In the above embodiments, the displayed advance notice information varies depending on whether the unlocking conditions are satisfied when the player character 100 has moved into the second area 203. The invention is not limited to this configuration, and the displayed advance notice information may vary depending on whether the unlocking conditions are satisfied when the player character has moved into the first area 202. For example, when the player character 100 has moved into the first area 202, if the unlocking conditions for the door 201 are not satisfied, a display different from the symbol "!" may be provided. Otherwise, nothing may be displayed. In this case, it is not necessary for the player to purposely move the player character 100 close to the door 201 that cannot be opened, if the symbol "!" is not displayed in the first area 202, which is relatively remote from the door 201. As a result, the game can be advanced more quickly.

In the above embodiment, a door manipulating method is displayed as the advance notice information when the unlocking conditions for the door 201 are satisfied in the second area 203. The displayed advance notice information is not limited to this kind of information. For example, the name of the next room may be displayed. In this case, the player can easily identify the destination room from the displayed name of the next room, even if different font colors, other than black and red, are used. As a result, it is easy to determine whether the player character can move into the next room.

In the above embodiment, a comment providing a hint for satisfying the unlocking conditions is displayed in a case where the player performs an action corresponding to the displayed comment manipulation method. The invention is not limited to this configuration, and the step of displaying the comment manipulation method may be omitted. In this case, a window 208 (see e.g., FIG. 8G) displaying a comment may be displayed when the player character 100 moves into the second area 203. That is, the comment manipulation method is not displayed in step S214 (shown in FIG. 6.) At step S214, the window 208 may be displayed, and steps S117 and S118 (shown in FIG. 5) may be omitted.

In the above embodiment, the advance notice information is displayed based on the positional condition of the player character 100 on the map 200, i.e., depending on whether the player character 100 has moved into the first area 202 or into the second area 203. The invention is not limited to this configuration, and other conditions may be used together with the positional condition.

For example, the direction of the body of the player character 100 may be used as one condition. In this case, the advance notice information may be displayed when the player character 100 faces in a given direction relative to the door 201 within the advance notice areas. In the case where the player character 100 does not face in a given direction relative to the door 201, the advance notice information may not be displayed. Furthermore, of the advance notice information, only the door manipulating method and the comment manipulation method may be displayed. In this case, the game may be configured so that the door 201 cannot be opened unless the player character 100 faces in a given direction relative to the door 201. Where the character cannot be moved into another room unless the player character 100 faces in a given direction relative to the door 201, the advance notice information, especially the door manipulating method and the comment manipulation method for indicating that the door 201 is locked, is useless information for the player. In this embodiment, such useless information displayed on the display screen 122 is minimized. Therefore, the player is not annoyed with information that is unnecessary for the progress of the game.

Furthermore, the conditions under which the advance notice information is displayed may be different between the first area 202 and the second area 203. For example, where the player character 100 has moved into the first area 202, the advance notice information may be displayed irrespective of the direction of body of the player character 100. Where the character has moved into the second area 202, the advance notice information may be displayed depending on the direction of the body of the player character 100.

In addition, the first area 202 and the second area 203 may be set according to the distance between the player character 100 and the predetermined reference position of the door 201. Further, the distance which is taken between the player character 100 and the door 201, and which sets at least one of the first area 202 and second area 203, may vary depending on the experiential value of the player or another element.

In the above embodiment, the advance notice areas have the first area 202 and second area 203. The advance notice areas may have only the second area 203. Furthermore, a zeroth area may be set outside the first area 202. Symbol "?" may be displayed in the zeroth area. In this case, even if the player cannot recognize the display of the door 201 on the display screen 122, the player can see that the character is approaching the door 201 when the display provided over the head of the player character 100 turns from "?" to "1".

In the above embodiment, the symbols "!" and "!!" of the advance notice information are displayed in the case where the player character 100 does not satisfy the unlocking conditions for the door 201. They may also be displayed only when the unlocking conditions are satisfied. In this case, when the player character 100 moves into the advance notice area, the control portion 103 reads the unlocking conditions about the advance notice area from the room data table 400 and determines whether the player character 100 satisfies the unlocking conditions. The subroutine for displaying an advance notice may be done only when the unlocking conditions are satisfied. Furthermore, the symbol "!" of the advance notice information may be displayed only when the unlocking conditions are satisfied and the symbol "!!" may be displayed regardless of satisfying the unlocking the condition. In this way, if the player character 100 fails to satisfy the unlocking conditions for the door 201, it is not necessary to bring the player character 100 close to the door 201. By displaying the advance notice information without having to bring the player character 100 close to the door 201, the player is prevented from performing a useless operation for progressing the game, i.e., having to search for the door 201 leading to a room to which the character cannot be moved. Hence, the game can be advanced more quickly.

In the above embodiment, an advance notice of the door is made in the first area 202 and the second area 203. The subject of an advance notice is not limited to doors. For example, the subject may be an item contained in a treasure chest that can assume a locked state and an unlocked state. In this case, the player character 100 is moved in accordance with the player's instructions using, for example, direction keys of the input portion 161. When the character moves to the advance notice area close to the treasure chest containing the item, the advance notice information is displayed over the head of the player character 100. In this case, advance notice information is displayed to indicate whether the treasure chest can be opened or not. In this way, the player is not urged to perform a useless manipulation to cause the player character 100 to acquire the item. Consequently, the game can be advanced smoothly.

In the above embodiment, it is assumed that the destination room, which may be entered through the door 201, has been stored in advance in the room data table 400. The present invention is not limited to this scheme. For example, when the player character 100 has moved into the advance notice areas, the destination room may be selected by lot. The map data 300 of the destination room determined by lot may be loaded into the RAM 105. In this case, the character can be moved to a different room depending on the timing at which the character moves to the advance notice areas, assuming that there is only one door 201. Consequently, the degree of pleasure of the game can be enhanced.

In the above embodiment, in the case where the room, in which the player character 100 went out of the advance notice areas, is the destination room, the font color of the message indicating the door manipulating method is turned from black to red. The invention is not limited to this configuration. The room already visited by the player character may be displayed on the display screen 122, e.g., by a message "room already visited". The conditions under which a search flag is set for each room are not limited to the fact that the player character went out of the advance notice areas. Another example of the conditions may be that the player character 100 has entered the room. A further example is that the player character has satisfied the conditions imposed by an event (e.g., a battle with an enemy character) set for the room. A yet further example is that the player character 100 has gained all the items placed in the room. A still further example is that the player character 100 has entered a given area that is set outside the advance notice areas of the room.

In the above embodiment, the virtual space in the game is divided into a plurality of areas by multiple rooms formed in a two-dimensional space. The virtual space may be divided into a plurality of areas by other methods, as the skilled artisan will readily appreciate, without departing from the spirit and/or scope of the invention. For example, the outside and inside of a building may be classified as different areas. Different floors in a building may be classified as different areas. Furthermore, partitioned areas can be obtained by arbitrarily combining these methods of classification (e.g., the outside and inside of a building may be classified as different areas; different floors may be classified as different areas; and the same floor may be divided into multiple rooms). Where the outside and inside of a building may be classified as different areas, the areas can be partitioned from each other using doors as traveling routes. Where different floors are classified as different areas, areas can be partitioned from each other using staircases (which might be prohibited from passage, for example) and elevators (which might not be operated, for example, due to power failure) as traveling routes. The present invention can similarly be applied to an outdoor space by dividing it into a plurality of areas where the traveling routes for the player character 100 may be restricted by gates, or the like.

In the above embodiment, when the player character 100 enters the second area 203, the door manipulating method is displayed when the unlocking conditions for the corresponding door 201 are satisfied. In the case where the unlocking conditions are not satisfied, the comment manipulation method is displayed. In a modified embodiment, the advance notice may include only the door manipulating method that is displayed when the unlocking conditions for the door 201 are satisfied. In another modified embodiment, the advance notice may include only the comment manipulation method that is displayed when the unlocking conditions for the door 201 are not satisfied. In the former modified embodiment, it is possible to determine that the player can open the door 201 if the door manipulating method is displayed, and that the door 201 cannot be opened if nothing is displayed. On the other hand, in the latter modified embodiment, it is possible to determine that the player cannot open the door 201 if the comment manipulation method is displayed, and that the door 201 can be opened if nothing is displayed.

In the above embodiment, the game machine main body 101, which is a dedicated machine, is used as a platform for executing a video game. A general-purpose personal computer can also be used if it possesses similar components as those of the game machine main body 101 and has a graphics function of drawing pictures. A portable game machine structured to house the display apparatus 121 and the sound processor 155 in the same casing of the game machine main body may be used. The present invention can also be applied to a network game which is advanced by plural players (users) using plural video game machines connected via servers on the network 3, as well as to games which are progressed on a stand-alone video game machine, or the like.

A semiconductor memory card can be used as the recording medium 131 instead of a DVD-ROM or a CD-ROM. A card slot for inserting the memory card may be provided instead of the DVD/CD-ROM drive 113. In the case of a general-purpose personal computer, programs and data associated with the present invention may be previously stored in the HDD 107, instead of being stored in the recording medium 131. According to the physical form of the hardware, and according to the method of circulation, any arbitrary type of medium capable of recording computer readable information can be used as the recording medium for storing and providing the programs and data associated with the present invention.

In the above embodiment, the program and data for the video game apparatus 1 are stored in the recording medium 131 and distributed. In contrast, the program and data may be stored in a hard disk drive possessed by a server machine existing on the network 3, and the program and data may be delivered to the game machine main body 101 via the network 3. In the video game apparatus 1, the program and data that the communication interface 115 receives from the server machine can be stored in the HDD 107 and loaded into the RAM 105 during execution.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A game apparatus for executing a game that is advanced by moving a player character in a virtual space, including a first field and a second field, the second field opening into the first field via a predetermined traveling route, and for displaying an image representing a status of the game being executed on a display, the game apparatus comprising:

a normal movement inputter operable to input an instruction to move the player character in the virtual space, including the first and second fields, in accordance with a player operation;

a cross-field movement inputter operable to input an instruction to move the player character from the first field to the second field through the traveling route in accordance with a player operation;

a normal mover operable to move the player character in any one of the first and second fields in which the player character is present in accordance with the instruction input from the normal movement inputter, the normal mover including a direction changer to change a direction of the player character in accordance with the instruction input from the normal movement inputter;

a movement restriction switcher operable to switch a status of the game between a cross-field movement disabled state, in which the player character is not allowed to move from the first field to the second field, and a cross-field movement enabled state, in which the player character is allowed to move from the first field to the second field, in accordance with conditions established during progress of the game;

a cross-field movement enable/disable determiner operable to determine whether the status of the game has been switched to the cross-field movement enabled state by the movement restriction switcher when the player character is moved by the normal mover to a specific region set based on a position of the traveling route within the first field;

a direction determiner that determines whether the direction that the player character faces is a given direction relative to the position of the traveling route between the first and second fields when the player character has been moved into the specific region by the normal mover;

a cross-field movement enable/disable displayer operable to display cross-field movement enable/disable information, indicating whether the player character is allowed to move from the first field to the second field on the display based upon the determination made by the cross-field movement enable/disable determiner, when the player character is determined to face in the given direction by the direction determiner;

a cross-field movement enablement displayer operable to display information indicating conditions to be established for switching the status from the cross-field movement disabled state to the cross-field movement enabled state by the movement restriction switcher when the cross-field movement enable/disable determiner determines that the status has been switched to the cross-field movement disabled state and when an instruction to move the player character from the first field to the second field is input from the cross-field movement inputter;

a cross-field mover operable to move the player character from the first field to the second field when an instruction to move the player character from the first field to the second field is input from the cross-field movement inputter and the cross-field movement enable/disable determiner determines that the status of the game is the cross-field movement enabled state; and a cross-field movement prohibiter operable to keep the player character within the first field without moving the player character to the second field when an instruction to move the player character from the first field to the second field is input from the cross-field movement inputter and the cross-field movement enable/disable determiner determines that the status of the game is the cross-field movement disabled state.

2. The game apparatus as set forth in claim 1, wherein the cross-field movement enable/disable displayer comprises a cross-field movement permission displayer operable to display cross-field movement permission information indicating that the player character is allowed to move from the first field to the second field as the cross-field movement enable/disable information when the cross-field movement enable/disable determiner determines that the status has been switched to the cross-field movement enabled state.

3. The game apparatus as set forth in claim 1, wherein the cross-field movement enable/disable displayer comprises a cross-field movement disability displayer operable to display cross-field movement disability information indicating that the player character is not allowed to move from the first field to the second field on the display as the cross-field movement enable/disable information when the cross-field movement enable/disable determiner determines that the status has been switched to the cross-field movement disabled state.

4. The game apparatus as set forth in claim 1, further comprising a traveling route displayer operable to display, on the display, traveling route information indicating a presence of a traveling route leading from the first field to the second field when the player character has been moved by the normal mover from the specific region to a second specific region within the first field, the second specific region being larger than the specific region, based on the position of the traveling route between the first and second fields.

5. The game apparatus as set forth in claim 1, further comprising:
- a movement information storage operable to store field movement information indicating whether the player character has been moved to the second field by the normal mover;
- a movement information determiner operable to determine whether the field movement information stored in the movement information storage indicates that the character has been moved to the second field when the cross-field movement enable/disable determiner determines that the status has been switched to the cross-field movement enabled state; and
- a movement history displayer operable to display movement history information indicating whether the player character has been moved to the second field on the display based upon the determination made by the movement information determiner.

6. The game apparatus as set forth in claim 1, wherein:
the virtual space includes a movement restriction object provided in the traveling route between the first and second fields in a virtual space, the movement restriction object comprising two states, including, an open state, in which the player character is allowed to move from the first field to the second field, and a closed state, in which the player character is not allowed to move from the first field to the second field, in the cross-field movement enabled state, the movement restriction object further having only a closed state in the cross-field movement disabled state, and the game apparatus further comprises an object state switcher operable to switch the cross-field movement restriction object from the closed state to the open state prior to the cross-field mover moving the player character from the first field to the second field, the object state switcher being further operable to switch the cross-field movement restriction object back to the closed state after the player character has moved to the second field.

7. The game apparatus as set forth in claim 1, further comprising:
- a map data fixed storage operable to store first map data made up of graphics data of the first field, including the traveling route, and second map data made up of graphics data of the second field, including the traveling route, respectively;
- a high-speed storage having a data readout rate higher than the data readout rate of the map data fixed storage, and having a character data area that stores character data made up of graphics data of the player character and a map data area that stores map data for any one data set of the first and second map data corresponding to the field including the position in which the player character has moved; and
- a map data loader operable to, retrieve map data corresponding to the field to which the player character has moved from the map data fixed storage, and to store the retrieved map data as a substitute for the map data, which has been stored so far, corresponding to the field from which the player character has moved into the map data area when the player character moves between the first and second fields.

8. The game apparatus as set forth in claim 6, wherein:
three or more fields, including the first and second fields, are provided in the virtual space, the fields neighboring with an other one or more fields via a predetermined traveling route, and the cross-field movement inputter is further operable to input an instruction that moves the player character from an arbitrary one of the fields, other than the first field, to another one of the fields adjacent to the arbitrary field via the traveling route in which the movement restriction object is provided, in accordance with the same player operation as the operation that inputs the instruction that moves the player character from the first field to the second field.

9. A game progressing method for executing a game on a computer system, the game being advanced by moving a player character in a virtual space, including a first field and a second field, the second field opening into the first field via a predetermined traveling route, the computer system comprising:
- a storage including a character position storage area operable to store positions and directions of the player character in the virtual space;
- a normal movement inputter operable to input an instruction to move the player character in the virtual space, including the first and second fields, in accordance with a player operation;
- a cross-field movement inputter operable to input an instruction to move the player character from the first field to the second field through the traveling route in accordance with a player operation; and
- a displayer operable to generate and display game images representing a status of the game being executed, the game progressing method comprising:
- moving the player character in any one of the first and second fields, in which the player character is present, in accordance with an instruction input from the normal movement inputter, changing the direction of the player character in accordance with the instruction input from the normal moment inputter, and storing the position and direction of the moved player character in the character position storage area;
- switching the status between a cross-field movement disabled state, in which the player character cannot move from the first field to the second field, and a cross-field movement enabled state, in which the player character can move from the first field to the second field, according to conditions established during progress of the game, and storing information indicating to which of the cross-field movement disabled state and cross-field movement enabled state has the status been switched in a cross-field enable/disable storage area contained in the storage;
- determining to which of the cross-field movement disabled state and cross-field movement enabled state has the status been switched by referring to the cross-field movement enable/disable storage area when the player character moves into a specific region set based on a position of the traveling route within the first field;

determining whether the direction that the player character faces is in a given direction relative to the position of the traveling route between the first and second fields when the player character has moved into the specific region;

displaying cross-field movement enable/disable information, indicating whether the player character can be moved from the first field to the second field depending on a determination to which of the cross-field movement enabled state and cross-field movement disabled state has the status been switched on the displayer, together with the game images, when the player character is determined to face in the given direction;

displaying information indicating the conditions to be established for switching the status from the cross-field movement disabled state to the cross-field movement enabled state when the status has been switched to the cross-field movement disabled state and when an instruction to move the player character from the first field to the second field is input from the cross-field movement inputter;

moving the player character from the first field to the second field when it is determined that the status has been switched to the cross-field movement enabled state and, when the instruction to move the player character from the first field to the second field is input from the cross-field movement inputter, and storing the position of the moved player character in the character position storage area; and causing the position stored in the character position storage area to be retained within the first field without moving the player character to the second field when it is determined that the status has been switched to the cross-field movement disabled state, and when the instruction to move the player character from the first field to the second field is input from the cross-field movement inputter.

10. A computer-readable recording medium in which a program executable on a computer system is recorded, the computer system being connected with a displayer for displaying an image representing a status of a game being executed, the game being advanced by moving a player character in a virtual space, including a first field and a second field, the second field opening into the first field via a predetermined traveling route, the recording medium comprising:

a normal movement inputter executable to input an instruction to move the player character in the virtual space, including the first and second fields, in accordance with a player operation;

a cross-field movement inputter executable to input an instruction to move the player character from the first field to the second field through the traveling route in accordance with a player operation;

a normal mover executable to move the player character in any one of the first and second fields in which the player character is present in accordance with the instruction input from the normal movement inputter the normal mover including a direction changer that changes a direction of the player character in accordance with the instruction input from the normal movement inputter;

a movement restriction switcher executable to switch a status of the game between a cross-field movement disabled state, in which the player character is not allowed to move from the first field to the second field, and a cross-field movement enabled state, in which the player character is allowed to move from the first field to the second field, in accordance with conditions established during progress of the game;

a cross-field movement enable/disable determiner executable to determine whether the status has been switched to the cross-field movement enabled state by the movement restriction switcher when the player character is moved by the normal mover to a specific region set based on a position of the traveling route within the first field;

a direction determiner that determines whether the direction that the player character faces is in a given direction relative to the position of the traveling route between the first and second fields when the player character has been moved into the specific region by the normal mover;

a cross-field movement enable/disable displayer executable to display cross-field movement enable/disable information indicating whether the player character is allowed to move from the first field to the second field on the display based upon the determination made by the cross-field movement enable/disable determiner when the player character is determined to face in the given direction by the direction determiner a cross-field movement enablement displayer executable to display information indicating conditions to be established for switching the status from the cross-field movement disabled state to the cross-field movement enabled state by the movement restriction switcher when the cross-field movement enable/disable determiner determines that the status has been switched to the cross-field movement disabled state and when an instruction to move the player character from the first field to the second field is input from the cross-field movement inputter;

a cross-field mover executable to move the player character from the first field to the second field when an instruction to move the player character from the first field to the second field is input from the cross-field movement inputter and when the cross-field movement enable/disable determiner determines that the status has been switched to the cross-field movement enabled state; and a cross-field movement prohibiter executable to keep the player character within the first field without moving the player character to the second field when an instruction to move the player character from the first field to the second field is input from the cross-field movement inputter and when the cross-field movement enable/disable determiner determines that the status has been switched to the cross-field movement disabled state.

11. A game apparatus for executing a game that is advanced by moving a player character in a virtual space, including a first field and a second field, the second field opening into the first field via a predetermined traveling route, and for displaying an image representing a status of the game being executed on a display, the game apparatus comprising:

a normal movement inputter operable to input an instruction to move the player character in the virtual space, including the first and second fields, in accordance with a player operation;

a cross-field movement inputter operable to input an instruction to move the player character from the first field to the second field through the traveling route in accordance with a player operation;

a normal mover operable to move the player character in any one of the first and second fields in which the player character is present in accordance with the instruction input from the normal movement inputter, the normal mover including a direction changer to change a direction of the player character in accordance with the instruction input from the normal movement inputter;

a movement restriction switcher operable to switch a status of the game between a cross-field movement disabled state, in which the player character is not allowed to move from the first field to the second field, and a cross-field movement enabled state, in which the player character is allowed to move from the first field to the second field, in accordance with conditions established during progress of the game;

a cross-field movement enable/disable determiner operable to determine whether the status of the game has been switched to the cross-field movement enabled state by the movement restriction switcher when the player character is moved by the normal mover to a specific region set based on a position of the traveling route within the first field;

a direction determiner that determines whether the direction that the player character faces is a given direction relative to the position of the traveling route between the first and second fields when the player character has been moved into the specific region by the normal mover;

a cross-field movement enable/disable displayer operable to display cross-field movement enable/disable information, indicating whether the player character is allowed to move from the first field to the second field on the display based upon the determination made by the cross-field movement enable/disable determiner, when the player character is determined to face in the given direction by the direction determiner;

a cross-field mover operable to move the player character from the first field to the second field when the direction determiner determines that the player character faces in the given direction, the instruction to move the player character from the first field to the second field is input from the cross-field movement inputter, and the cross-field movement enable/disable determiner determines that the status of the game is the cross-field movement enabled state; and a cross-field movement prohibiter operable to keep the player character within the first field without moving the player character to the second field when the instruction to move the player character from the first field to the second field is input from the cross-field movement inputter and the cross-field movement enable/disable determiner determines that the status of the game is the cross-field movement disabled state, wherein the cross-field movement prohibiter is operable to keep the player character within the first field without moving the player character to the second field when the direction determiner determines that the direction the player character faces is not the given direction, even when the cross-field movement enable/disable determiner determines that the status of the game has been switched to the cross-field movement enabled state and the instruction to move the player character from the first field to the second field is input from the cross-field movement inputter.

12. A game progressing method for executing a game on a computer system, the game being advanced by moving a player character in a virtual space, including a first field and a second field, the second field opening into the first field via a predetermined traveling route, the computer system comprising:

a storage including a character position storage area operable to store positions and directions of the player character in the virtual space;

a normal movement inputter operable to input an instruction to move the player character in the virtual space, including the first and second fields, in accordance with a player operation;

a cross-field movement inputter operable to input an instruction to move the player character from the first field to the second field through the traveling route in accordance with a player operation; and a displayer operable to generate and display game images representing a status of the game being executed, the game progressing method comprising:

moving the player character in any one of the first and second fields, in which the player character is present, in accordance with an instruction input from the normal movement inputter, changing the direction of the player character in accordance with the instruction input from the normal moment inputter, and storing the position and direction of the moved player character in the character position storage area;

switching the status between a cross-field movement disabled state, in which the player character cannot move from the first field to the second field, and a cross-field movement enabled state, in which the player character can move from the first field to the second field, according to conditions established during progress of the game, and storing information indicating to which of the cross-field movement disabled state and cross-field movement enabled state has the status been switched in a cross-field enable/disable storage area contained in the storage;

determining to which of the cross-field movement disabled state and cross-field movement enabled state has the status been switched by referring to the cross-field movement enable/disable storage area when the player character moves into a specific region set based on a position of the traveling route within the first field;

determining whether the direction that the player character faces is in a given direction relative to the position of the traveling route between the first and second fields when the player character has moved into the specific region;

displaying cross-field movement enable/disable information, indicating whether the player character can be moved from the first field to the second field depending on a determination to which of the cross-field movement enabled state and cross-field movement disabled state has the status been switched on the displayer, together with the game images, when the player character is determined to face in the given direction;

moving the player character from the first field to the second field when it is determined that the direction the player character faces is the given direction, it is determined that the status has been switched to the cross-field movement enabled state, and the instruction to move the player character from the first field to the second field is input from the cross-field movement inputter, and storing the position of the moved player character in the character position storage area;

causing the position stored in the character position storage area to be retained within the first field without moving the player character to the second field when it is determined that the status has been switched to the cross-field movement disabled state and the instruction to move the player character from the first field to the second field is input from the cross-field movement inputter; and causing the position stored in the character position storage area to be retained within the first field without moving the player character to the second field when it is determined that the direction the player character faces is not the given direction, even when it is determined that the status of the game has been switched to the cross-field movement enabled state and the instruction to move the player character from the first field to the second field is input from the cross-field movement inputter.

13. A computer-readable recording medium in which a program executable on a computer system is recorded, the computer system being connected with a displayer for displaying an image representing a status of a game being executed, the game being advanced by moving a player character in a virtual space, including a first field and a second field, the second field opening into the first field via a predetermined traveling route, the recording medium comprising:

a normal movement inputter executable to input an instruction to move the player character in the virtual space, including the first and second fields, in accordance with a player operation;

a cross-field movement inputter executable to input an instruction to move the player character from the first field to the second field through the traveling route in accordance with a player operation;

a normal mover executable to move the player character in any one of the first and second fields in which the player character is present in accordance with the instruction input from the normal movement inputter the normal mover including a direction changer that changes a direction of the player character in accordance with the instruction input from the normal movement inputter;

a movement restriction switcher executable to switch a status of the game between a cross-field movement disabled state, in which the player character is not allowed to move from the first field to the second field, and a cross-field movement enabled state, in which the player character is allowed to move from the first field to the second field, in accordance with conditions established during progress of the game;

a cross-field movement enable/disable determiner executable to determine whether the status has been switched to the cross-field movement enabled state by the movement restriction switcher when the player character is moved by the normal mover to a specific region set based on a position of the traveling route within the first field;

a direction determiner that determines whether the direction that the player character faces is in a given direction relative to the position of the traveling route between the first and second fields when the player character has been moved into the specific region by the normal mover;

a cross-field movement enable/disable displayer executable to display cross-field movement enable/disable information indicating whether the player character is allowed to move from the first field to the second field on the display based upon the determination made by the cross-field movement enable/disable determiner when the player character is determined to face in the given direction by the direction determiner;

a cross-field mover executable to move the player character from the first field to the second field when the direction determiner determines that the player character faces in the given direction, the instruction to move the player character from the first field to the second field is input from the cross-field movement inputter, and the cross-field movement enable/disable determiner determines that the status has been switched to the cross-field movement enabled state; and a cross-field movement prohibiter executable to keep the player character within the first field without moving the player character to the second field when the instruction to move the player character from the first field to the second field is input from the cross-field movement inputter and the cross-field movement enable/disable determiner determines that the status has been switched to the cross-field movement disabled state, wherein the cross-field movement prohibiter is executable to keep the player character within the first field without moving the player character to the second field when the direction determiner determines that the direction the player character faces is not the given direction, even when the cross-field movement enable/disable determiner determines that the status of the game has been switched to the cross-field movement enabled state and the instruction to move the player character from the first field to the second field is input from the cross-field movement inputter.

* * * * *